United States Patent
Kaur et al.

(10) Patent No.: US 12,526,706 B2
(45) Date of Patent: Jan. 13, 2026

(54) TECHNIQUES FOR WIRELESS COMMUNICATIONS WITH A MASTER NODE IN A MASTER CELL GROUP WITHOUT A CHANGE IN A SECONDARY NODE IN A SECONDARY CELL GROUP

(71) Applicant: QUALCOMM Incorporated, San Diego, CA (US)

(72) Inventors: Jaspreet Kaur, Bridgewater, NJ (US); Rajat Aggarwal, Hyderabad (IN); Xipeng Zhu, San Diego, CA (US); Priya Rajan, Hillsborough, NJ (US); Punyaslok Purkayastha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 18/043,004

(22) PCT Filed: Oct. 21, 2021

(86) PCT No.: PCT/US2021/055968
§ 371 (c)(1),
(2) Date: Feb. 24, 2023

(87) PCT Pub. No.: WO2022/087214
PCT Pub. Date: Apr. 28, 2022

(65) Prior Publication Data
US 2023/0337073 A1    Oct. 19, 2023

(30) Foreign Application Priority Data
Oct. 22, 2020    (IN) .............................. 202021046189

(51) Int. Cl.
*H04W 36/00*    (2009.01)
*H04W 36/30*    (2009.01)

(52) U.S. Cl.
CPC ... *H04W 36/0064* (2023.05); *H04W 36/0033* (2013.01); *H04W 36/0058* (2018.08);
(Continued)

(58) Field of Classification Search
CPC ......... H04W 36/0064; H04W 36/0033; H04W 36/0058; H04W 36/00692; H04W 36/00698; H04W 36/305; H04W 8/22
See application file for complete search history.

(56) References Cited

U.S. PATENT DOCUMENTS

2016/0373972 A1*  12/2016  Vesely .............. H04W 36/0027
2020/0205123 A1    6/2020  Byun et al.
(Continued)

FOREIGN PATENT DOCUMENTS

KR    20180136862 A    12/2018

OTHER PUBLICATIONS

CATT: "Solutions for Inter-MeNB Handover Without SeNB Change", 3GPP Draft, R3-150219, 3GPP TSG RAN WG3#87, 3rd Generation Partnership Project (3GPP), Mobile Competence Centre, 650, Route Des Lucioles, F-06921 Sophia-Antipolis Cedex, France, vol. RAN WG3, No. Athens, Greece, Feb. 9, 2015-Feb. 13, 2015, Feb. 8, 2015 (Feb. 8, 2015), XP050936972, pp. 1-4.

(Continued)

*Primary Examiner* — Kan Yuen
(74) *Attorney, Agent, or Firm* — Dalei Dong; Holland & Hart LLP

(57) ABSTRACT

Techniques for wireless communications are described. A communication device, for example, a user equipment (UE) may transmit a request message to a target master base station based on a change in a state of the UE, and receive a response message from the target master base station based on the transmitted request message from the UE. The response message may include secondary node (SN) infor- (Continued)

mation and UE context reference shared to the target master base station from a source master base station (also referred to as a primary base station). The SN information corresponding to the same secondary base station associated with the UE while previously connected to the source master base station. The UE context reference may be stored at the same secondary base station.

30 Claims, 17 Drawing Sheets

(52) U.S. Cl.
CPC ............. *H04W 36/00692* (2023.05); *H04W 36/00698* (2023.05); *H04W 36/305* (2018.08)

(56) References Cited

U.S. PATENT DOCUMENTS

2021/0307100 A1* 9/2021 Talebi Fard .......... H04W 76/18
2022/0256411 A1* 8/2022 Liu ................. H04W 36/00698

OTHER PUBLICATIONS

Huawei: "Considerations on Support of RRC_Inactive", 3GPP Draft, R3-195254, 3GPP TSG-RAN3 Meeting #105bis, 3rd Generation Partnership Project (3GPP), Mobile Competence Centre, 650, Route Des Lucioles, F-06921 Sophia-Antipolis Cedex, France, vol. RAN WG3, No. Chongqing, China, Oct. 14, 2019-Oct. 18, 2019, Oct. 5, 2019 (Oct. 5, 2019), XP051810255, 7 Pages, p. 2-p. 5, figure 3.
International Search Report and Written Opinion—PCT/US2021/055968—ISA/EPO—Jan. 31, 2022 (208754WO).
Mediatek Inc: "Discussion on Suspended SCG", 3GPP Draft, R2-1914951, 3GPP TSG-RAN WG2 #108, 3rd Generation Partnership Project (3GPP), Mobile Competence Centre, 650, Route Des Lucioles, F-06921 Sophia-Antipolis Cedex, France, vol. RAN WG2, No. Reno, Nevada, USA, Nov. 18, 2019-Nov. 22, 2019, Nov. 8, 2019 (Nov. 8, 2019), XP051816890, 3 Pages, p. 2, figure 1.

* cited by examiner

TECHNIQUES FOR WIRELESS COMMUNICATIONS WITH A MASTER NODE IN A MASTER CELL GROUP WITHOUT A CHANGE IN A SECONDARY NODE IN A SECONDARY CELL GROUP

CROSS REFERENCE

The present Application is a 371 national stage filing of International PCT Application No. PCT/US2021/055968 by KAUR et al. entitled "TECHNIQUES FOR WIRELESS COMMUNICATIONS WITH A MASTER NODE IN A MASTER CELL GROUP WITHOUT A CHANGE IN A SECONDARY NODE IN A SECONDARY CELL GROUP," filed Oct. 21, 2021; and claims priority to Indian Patent Application No. 202021046189 by KAUR et al., entitled "TECHNIQUES FOR WIRELESS COMMUNICATIONS WITH A MASTER NODE IN A MASTER CELL GROUP WITHOUT A CHANGE IN A SECONDARY NODE IN A SECONDARY CELL GROUP," filed Oct. 22, 2020, each of which is assigned to the assignee hereof, and each of which is expressly incorporated by reference in its entirety herein.

FIELD OF DISCLOSURE

The present disclosure relates to wireless communications, more particularly to techniques for wireless communications with a master node (MN) in a master cell group (MCG) without a change in a secondary node (SN) in a secondary cell group (SCG).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In these systems, a UE may be configured to support dual connectivity, in which the UE can be connected to two cells, or in general, two cell groups, an MCG and an SCG. The two cell groups can be handled by different base stations (e.g., a NodeB, an eNodeB (eNB), a next-generation NodeB or a giga-NodeB (either of which may be referred to as a gNB)). The UE can also be in different operating states depending on data traffic in these systems. Examples of operating states includes a radio resource control (RRC) connected state, an RRC idle state, and an RRC inactive state. It may be desirable to increase reliability and decrease latency related to wireless communications when the UE changes an MCG (e.g., an eNB, a gNB).

SUMMARY

Various aspects of the present disclosure relate to configuring a communication device, such as a UE and a base station, for example, an eNB, a gNB in a wireless communications system to support techniques for wireless communications with an MN in an MCG without a change in an SN in a SCG. A UE may be configured to support dual connectivity, and thereby may support wireless communication with a source master base station (e.g., an MN of an MCG) and a secondary base station (e.g., an SN of a SCG). The source master base station may be configured to share UE context information including SN information, with a target master base station. For example, the target master base station may receive, from the UE, a resume request message or a re-establishment request message. In response, the target master base station may transmit a context request message to the source master base station (i.e., a last serving master base station), which may respond with a context response message that includes the SN information and UE context reference information stored at the secondary base station (e.g., an SN). The target master base station can use this SN information to determine whether to maintain or release the secondary base station for the UE. This shared SN information may thereby support the target master base station to maintain the same secondary base station, and as a result may improve delta signaling towards the UE for the secondary base station during connection resume and help in faster data path establishment if the secondary base station is retained at the target master base station. The UE may also experience power saving by promoting higher reliability and lower latency wireless communications, among other benefits.

A method of wireless communication at a UE is described. The method may include transmitting a request message to a target master base station based on a change in a state of the UE, receiving a response message from the target master base station based on the transmitted request message from the UE, the response message including SN information shared to the target master base station from a source master base station, the SN information corresponding to the same secondary base station associated with the UE while previously connected to the source master base station, and the UE context reference is stored at the same secondary base station, and confirming a configuration associated with the same secondary base station.

An apparatus for wireless communication at a UE is described. The apparatus may include a processor, memory coupled with the processor, and instructions stored in the memory. The instructions may be executable by the processor to cause the apparatus to transmit a request message to a target master base station based on a change in a state of the UE, receive a response message from the target master base station based on the transmitted request message from the UE, the response message including SN information and UE context reference shared to the target master base station from a source master base station, the SN information corresponding to the same secondary base station associated with the UE while previously connected to the source master base station, and the UE context reference is stored at the same secondary base station, and confirm a configuration associated with the same secondary base station.

Another apparatus for wireless communication at a UE is described. The apparatus may include means for transmitting a request message to a target master base station based on a change in a state of the UE, receiving a response message from the target master base station based on the transmitted request message from the UE, the response message including SN information and UE context reference shared to the target master base station from a source master base station, the SN information corresponding to the same secondary base station associated with the UE while previously connected to the source master base station, and the UE context reference is stored at the same secondary base station, and confirming a configuration associated with the same secondary base station.

A non-transitory computer-readable medium storing code for wireless communication at a UE is described. The code may include instructions executable by a processor to transmit a request message to a target master base station based on a change in a state of the UE, receive a response message from the target master base station based on the transmitted request message from the UE, the response message including SN information and UE context reference shared to the target master base station from a source master base station, the SN information corresponding to the same secondary base station associated with the UE while previously connected to the source master base station, and the UE context reference is stored at the same secondary base station, and confirm a configuration associated with the same secondary base station.

In some examples of the method, apparatuses, and non-transitory computer-readable medium described herein, the request message includes an RRC message and the response message includes an RRC response message.

In some examples of the method, apparatuses, and non-transitory computer-readable medium described herein, the RRC request message includes an RRC connection resume message.

In some examples of the method, apparatuses, and non-transitory computer-readable medium described herein, the RRC request message includes an RRC connection re-establishment message.

In some examples of the method, apparatuses, and non-transitory computer-readable medium described herein, the state of the UE includes an RRC inactive state.

In some examples of the method, apparatuses, and non-transitory computer-readable medium described herein, the request message includes an indication of the UE preserving a SCG configuration associated with the same secondary base station.

Some examples of the method, apparatuses, and non-transitory computer-readable medium described herein may further include operations, features, means, or instructions for determining a radio link failure (RLF) associated with the source master base station. In some examples of the method, apparatuses, and non-transitory computer-readable medium described herein, transmitting the request message including the indication of the UE preserving the SCG configuration associated with the same secondary base station is further based at least in part on the determined RLF.

In some examples of the method, apparatuses, and non-transitory computer-readable medium described herein, the response message includes an indication to restore a connection with the same secondary base station based at least in part on one or both of the indication of the UE preserving the SCG configuration associated with the same secondary base station or the UE context reference being stored at the same secondary base station.

In some examples of the method, apparatuses, and non-transitory computer-readable medium described herein, the response message includes an indication to report a set of radio resource management measurement (RRM) results associated with the same secondary base station, the set of RRM measurement results including a signal strength or a signal quality associated with the same secondary base station. Some examples of the method, apparatuses, and non-transitory computer-readable medium described herein may further include operations, features, means, or instructions for transmitting the report indicating the set of RRM measurement results to the target master base station.

A method of wireless communication at a target master base station is described. The method may include transmitting a context request message to a source master base station associated with a UE, receiving, based on the transmitted context request message, a context response message including SN information and UE context reference, from the source master base station, the SN information corresponding to at least one secondary base station associated with the UE, and the UE context reference is stored at the at least one secondary base station, and performing the wireless communication with the UE based on the received context response message.

An apparatus for wireless communication at a target master base station is described. The apparatus may include a processor, memory coupled with the processor, and instructions stored in the memory. The instructions may be executable by the processor to cause the apparatus to transmit a context request message to a source master base station associated with a UE, receive, based on the transmitted context request message, a context response message including SN information and UE context reference, from the source master base station, the SN information corresponding to at least one secondary base station associated with the UE, the UE context reference is stored at the at least one secondary base station, and perform the wireless communication with the UE based on the received context response message.

Another apparatus for wireless communication at a target master base station is described. The apparatus may include means for transmitting a context request message to a source master base station associated with a UE, receiving, based on the transmitted context request message, a context response message including SN information and UE context reference, from the source master base station, the SN information corresponding to at least one secondary base station associated with the UE, the UE context reference is stored at the at least one secondary base station, and performing the wireless communication with the UE based on the received context response message.

A non-transitory computer-readable medium storing code for wireless communication at a target master base station is described. The code may include instructions executable by a processor to transmit a context request message to a source master base station associated with a UE, receive, based on the transmitted context request message, a context response message including SN information and UE context reference from the source master base station, the SN information corresponding to at least one secondary base station associated with the UE, the UE context reference is stored at the at least one secondary base station, and perform the wireless communication with the UE based on the received context response message.

Some examples of the method, apparatuses, and non-transitory computer-readable medium described herein may further include operations, features, means, or instructions for receiving in an information element of the context response message the SN information.

Some examples of the method, apparatuses, and non-transitory computer-readable medium described herein may further include operations, features, means, or instructions for maintaining the secondary base station for the UE, based on the SN information, during an RRC resume or an RRC connection reestablishment.

Some examples of the method, apparatuses, and non-transitory computer-readable medium described herein may further include operations, features, means, or instructions for transmitting an additional context confirm message to confirm transfer of UE context information and maintain the secondary base station for the UE.

In some examples of the method, apparatuses, and non-transitory computer-readable medium described herein, the additional context confirm message includes an indication of maintaining or releasing the secondary base station.

In some examples of the method, apparatuses, and non-transitory computer-readable medium described herein, the additional context confirm message includes an indication of transferring one or more radio bearers from the source master base station.

In some examples of the method, apparatuses, and non-transitory computer-readable medium described herein, the additional context confirm message includes an indication of transferring one or more packet data units (PDU) session resources and data forwarding information from the source master base station.

Some examples of the method, apparatuses, and non-transitory computer-readable medium described herein may further include operations, features, means, or instructions for receiving a RRC request message from the UE based on a change in a RRC state of the UE, and where transmitting the context request message to the source master base station may be based at least on the received RRC request message from the UE.

In some examples of the method, apparatuses, and non-transitory computer-readable medium described herein, the RRC state includes an RRC inactive state, an RRC connected state, or an RRC idle state.

In some examples of the method, apparatuses, and non-transitory computer-readable medium described herein, the RRC request message includes an RRC connection resume message.

In some examples of the method, apparatuses, and non-transitory computer-readable medium described herein, the RRC request message includes an RRC connection re-establishment message.

Some examples of the method, apparatuses, and non-transitory computer-readable medium described herein may further include operations, features, means, or instructions for transmitting an RRC response message to the UE based on the received RRC request message from the UE, the RRC response message including SCG configuration information.

Some examples of the method, apparatuses, and non-transitory computer-readable medium described herein may further include operations, features, means, or instructions for transmitting, to the source base station, an XN-U address indication message to share data forwarding information with the source base station.

Some examples of the method, apparatuses, and non-transitory computer-readable medium described herein may further include operations, features, means, or instructions for receiving the request message from the UE, the request message including an indication of the UE preserving a SCG configuration associated with the at least one secondary base station, determining to preserve the at least one secondary base station for the UE based at least in part on one or both of the indication of the UE preserving the SCG configuration associated with the at least one secondary base station or the UE context reference being stored at the least one secondary base station, transmitting a response message to the UE indicating to restore a connection with the least one secondary base station based at least in part on the determining, and releasing the least one secondary base station (e.g., secondary node) based at least in part on a lack of persevering the SCG configuration (e.g., if not confirmed by the UE).

Some examples of the method, apparatuses, and non-transitory computer-readable medium described herein may further include operations, features, means, or instructions for transmitting a response message to the UE including an indication to report a set of RRM measurement results associated with the least one secondary base station, the set of RRM measurement results including a signal strength or a signal quality associated with the least one secondary base station, and receiving the report indicating the set of RRM measurement results based at least in part on the transmitted response message.

A method of wireless communication at a source master base station is described. The method may include receiving a context request message from a target master base station associated with a UE and transmitting, based on the received context request message, a context response message including SN information and UE context reference, to the target master base station, the SN information corresponding to at least one secondary base station associated with the UE, and the UE context reference is stored at the same secondary base station.

An apparatus for wireless communication at a source master base station is described. The apparatus may include a processor, memory coupled with the processor, and instructions stored in the memory. The instructions may be executable by the processor to cause the apparatus to receive a context request message from a target master base station associated with a UE and transmit, based on the received context request message, a context response message including SN information and UE context reference, to the target master base station, the SN information corresponding to at least one secondary base station associated with the UE, and the UE context reference is stored at the same secondary base station.

Another apparatus for wireless communication at a source master base station is described. The apparatus may include means for receiving a context request message from a target master base station associated with a UE and transmitting, based on the received context request message, a context response message including SN information and UE context reference, to the target master base station, the SN information corresponding to at least one secondary base station associated with the UE, and the UE context reference is stored at the same secondary base station.

A non-transitory computer-readable medium storing code for wireless communication at a source master base station is described. The code may include instructions executable by a processor to receive a context request message from a target master base station associated with a UE and transmit, based on the received context request message, a context response message including SN information and UE context reference, to the target master base station, the SN information corresponding to at least one secondary base station associated with the UE, and the UE context reference is stored at the same secondary base station.

Some examples of the method, apparatuses, and non-transitory computer-readable medium described herein may further include operations, features, means, or instructions for transmitting in an information element of the context response message the SN information.

Some examples of the method, apparatuses, and non-transitory computer-readable medium described herein may further include operations, features, means, or instructions for receiving an additional context confirm message to confirm transfer of UE context information and maintain the secondary base station for the UE.

In some examples of the method, apparatuses, and non-transitory computer-readable medium described herein, the additional context confirm message includes an indication of maintaining or releasing the secondary base station during an RRC resume or an RRC connection reestablishment.

In some examples of the method, apparatuses, and non-transitory computer-readable medium described herein, the additional context confirm message includes an indication of transferring one or more radio bearers from the source master base station to the target master base station.

In some examples of the method, apparatuses, and non-transitory computer-readable medium described herein, the additional context confirm message includes an indication of transferring one or more PDUs session resources and data forwarding information from the source master base station to the target master base station.

Some examples of the method, apparatuses, and non-transitory computer-readable medium described herein may further include operations, features, means, or instructions for receiving, from the target base station, an XN-U address indication message sharing data forwarding information with the source base station.

DETAILED DESCRIPTION

Figure 1:
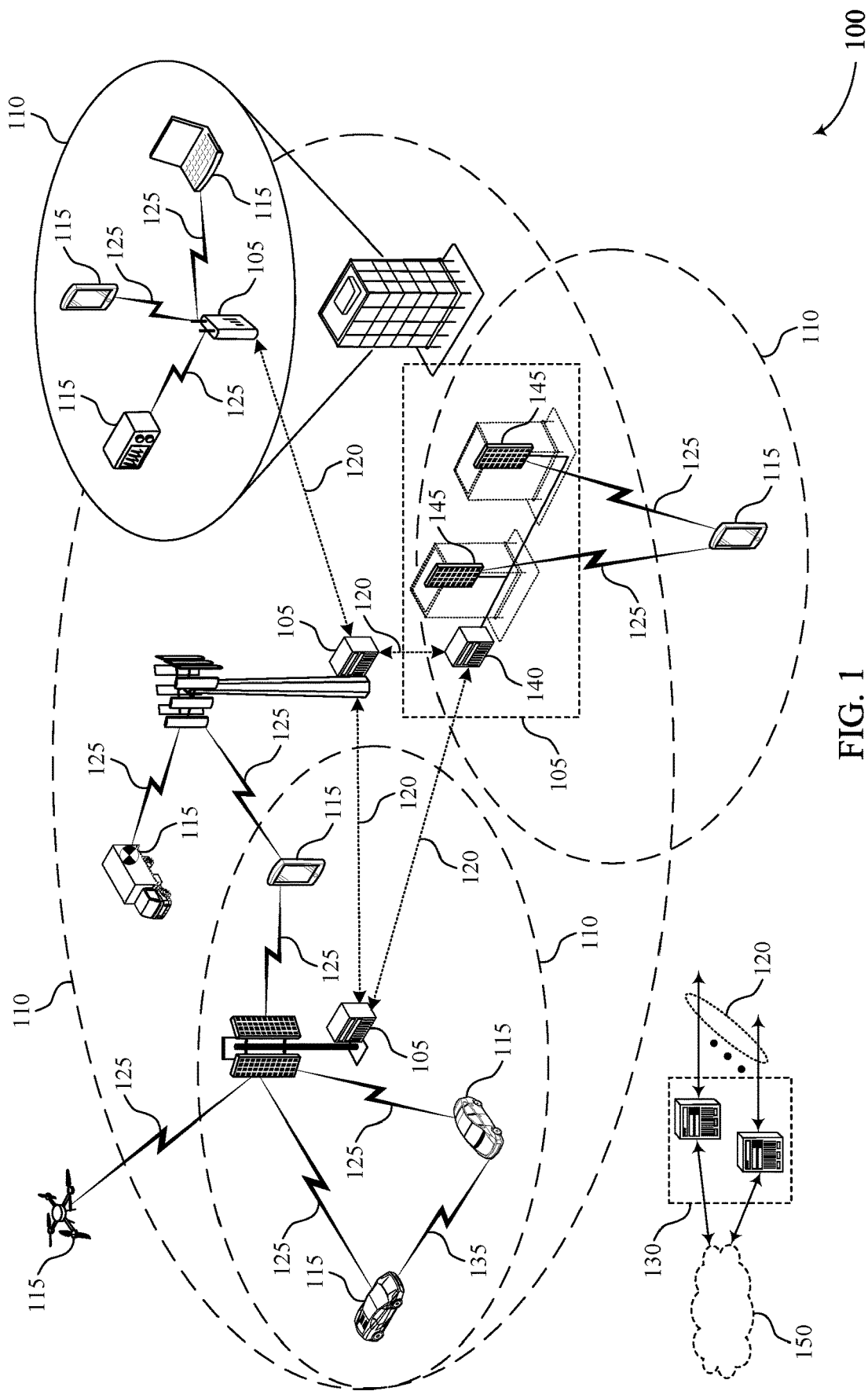
FIGS. 1 and 2 illustrate examples of wireless communication systems that support techniques for wireless communications with a MN in an MCG without a change in a SN in a SCG in accordance with various aspects of the present disclosure.

A wireless communications system may include communication devices, such as a UE and a base station (e.g., an eNB, a gNB, or some other base station), that support wireless communications over one or multiple radio access technologies. Examples of radio access technologies include 4G systems, such as LTE systems, and 5G systems, which may be referred to as NR systems. In the wireless communications system, the UE may be configured to support dual connectivity, and thereby may support wireless communication with a source master base station (e.g., an MN of an MCG) and a secondary base station (e.g., an SN of a SCG). The UE may, in some cases, switch from an RRC connected state to an RRC inactive state to reduce signaling overhead, decrease power consumption during UE inactivity, among other examples.

In the RRC inactive state, UE context information may be preserved at both the UE and the secondary base station. In some cases, if the UE determines to resume a connection on a target master base station (e.g., a target MN of a target MCG), then currently there is no mechanism for the source master base station to share the UE context information stored at the secondary base station with the target master base station. This shortcoming results in added latency related to data path establishment for the UE because the target master base station has to query various base stations for the UE to connect to and establish the data path to the secondary base station without any prior SN information. The source master base station may be configured to share UE context information including SN information, with a target master base station.

For example, the target master base station may receive, from the UE, a resume request message or a re-establishment request message. In response, the target master base station may transmit a context request message to the source master base station (e.g., a last serving master base station), which may respond with a context response message that includes the SN information and UE context reference stored at the secondary base station (e.g., an SN). The target master base station can use this SN information to determine whether to maintain or release the secondary base station for the UE. This shared SN information may thereby support the target master base station to maintain the same secondary base station, and as a result may improve delta signaling towards the UE for the secondary base station during connection resume and help in faster data path establishment if the secondary base station is retained at the target master base station. The UE may experience power saving by promoting higher reliability and lower latency wireless communications, among other benefits.

Aspects of the subject matter described in the present disclosure may be implemented to realize one or more of the following potential improvements, among others. The present disclosure may provide benefits and enhancements to the operation of the UE. For example, operations performed by the base stations and the UE may provide improvements to wireless communications. In some examples, configuring the base stations and the UE to support techniques for sharing of SN information may support improvements to power consumption, spectral efficiency, and, in some examples, may promote higher reliability and lower latency for downlink and uplink communications, among other benefits.

Aspects of the present disclosure are initially described in the context of wireless communications systems. Aspects of the present disclosure are further illustrated by and described with reference to apparatus diagrams, system diagrams, and flowcharts that relate to techniques for wireless communications with a MN in an MCG without a change in a SN in a SCG.

FIG. 1 illustrates an example of a wireless communications system 100 that supports techniques for wireless communications with a MN in an MCG without a change in a SN in a SCG in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A UE 115 may be configured to support dual connectivity, and thereby may support wireless communication with a source master base station 105 (e.g., an MN of an MCG) and a secondary base station 105 (e.g., an SN of a SCG). The UE 115 may, in some cases, switch from an RRC connected state to an RRC inactive state to reduce signaling overhead, decrease power consumption during UE inactivity, among other examples. In the RRC inactive state, UE context information may be preserved at both the UE 115 and the secondary base station 105. In some cases, if the UE 115 determines to resume a connection on a target master base station 105 (e.g., a target MN of a target MCG), there might not be mechanism for the source master base station 105 to share the UE context information including SN information stored at the secondary base station 105 with the target master base station 105. This shortcoming results in added latency related to data path establishment for the UE 115. The source master base station may be configured to share UE context information including SN information, with a target master base station.

In some cases, an MN change without SN change may be supported in a handover procedure, but not supported in an RRC resume procedure. The UE 115 may be configured to support inter MN resume without SN change, with inter-MN handover without SN change procedure as reference. The source base station or the target base station, or both, may be configured to add "UE Context Reference at the S-NG-RAN node" (with SN node ID and SN XnAP UE ID, as defined in a handover request) into a Retrieve UE context response message, as described herein. The source base station or the target base station, or both, may be configured to generate a new XnAP message (e.g., retrieve UE context confirm message) to carry following IEs equivalent to a handover request acknowledgement message, including an SN UE context kept indicator, one or more data radio bearer (DRB) transferred to the MN, or a PDU session resource admitted list, or any combination thereof.

By way of example, the target master base station 105 may receive, from the UE 115, a resume request message or a re-establishment request message. In response, the target master base station 105 may transmit a context request message to the source master base station 105 (e.g., a last serving master base station), which may respond with a context response message that includes the SN information. The target master base station 105 can use this SN information to determine whether to maintain or release the secondary base station 105 for the UE 115. This shared SN information may thereby support the target master base station 105 to maintain the same secondary base station 105, and as a result may improve delta signaling towards the UE 115 for the secondary base station 105 during connection resume and help in faster data path establishment if the secondary base station 150 is retained at the target master base station 105. Additionally, or alternatively, the source master base station 105 may transmit, to the target master base station 105, a retrieve UE context confirm message, which may include one or more of the above example IEs.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where ($\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). A slot may further be divided into multiple mini-slots containing one or more symbols. Excluding the cyclic prefix, each symbol period may contain one or more (e.g., $N_f$) sampling periods. The duration of a symbol period may depend on the subcarrier spacing or radio frequency spectrum band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) radio frequency spectrum bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105. The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more radio frequency spectrum bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using radio frequency spectrum bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

Transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
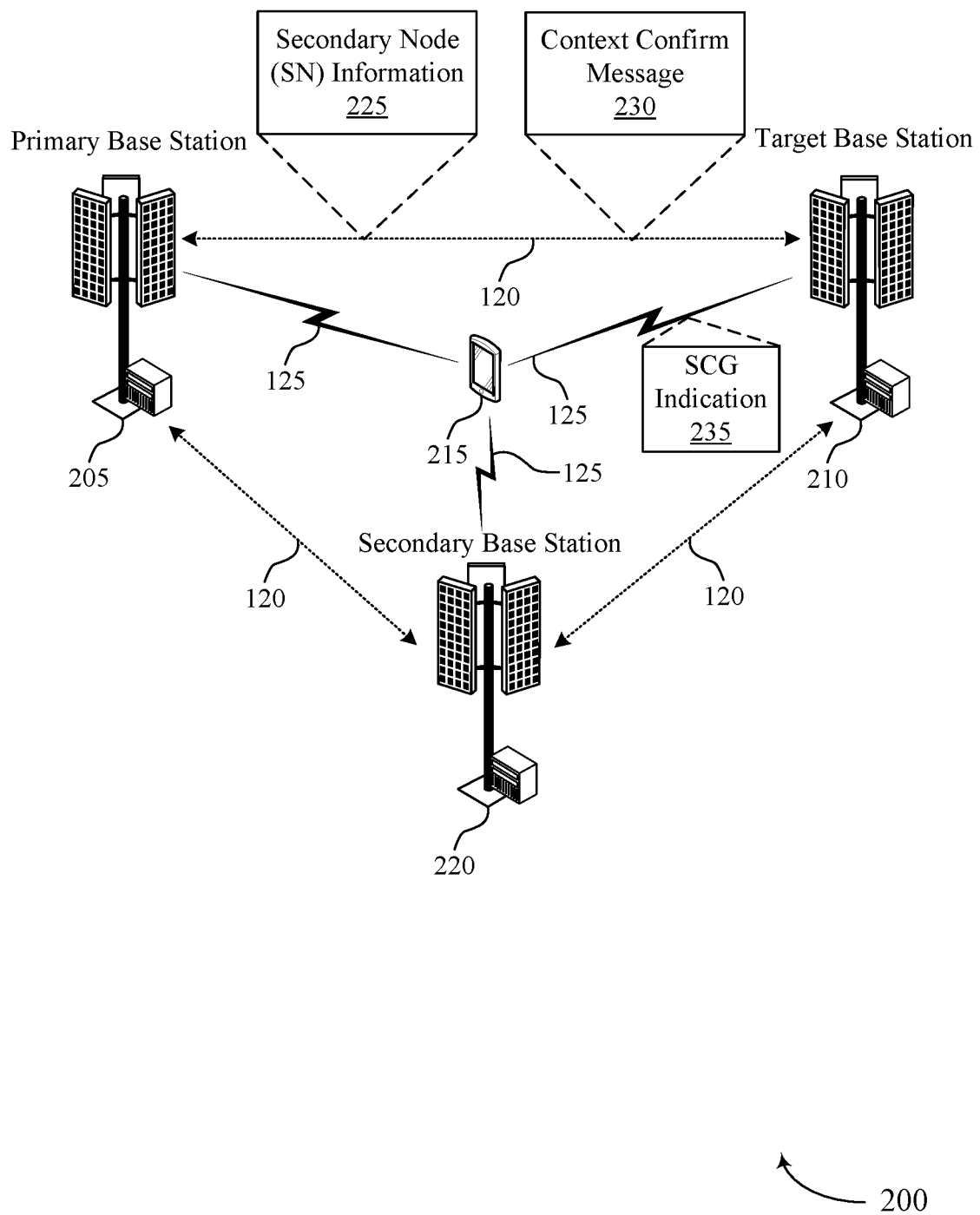

FIG. 2 illustrates an example of a wireless communications system 200 that supports techniques for wireless communications with a MN in an MCG without a change in a SN in a SCG in accordance with various aspects of the present disclosure. In some examples, the wireless communications system 200 may implement aspects of the wireless communications system 100. For example, the wireless communications system 200 may include a primary base station 205 (also referred to as a source base station), a target base station 210, a UE 215, and a secondary base station 220, which may be examples of the corresponding devices described with reference to FIG. 1. The wireless communications system 200 may support multiple radio access technologies including 4G systems such as LTE systems, LTE-A systems, or LTE-A Pro systems, and 5G systems, which may be referred to as NR systems.

In the example of FIG. 2, the UE 215 may be configured to support dual connectivity, in which the UE 215 can be connected to two cells, or in general, two cell groups, an MCG and an SCG. The two cell groups can be handled by different base stations (e.g., a NodeB, an eNB, a gNB). In some examples, the primary base station 205 may be an eNB, while the secondary base station 220 may be a gNB. That is, the primary base station 205 may be configured to support 4G radio access technologies, while the secondary base station 220 may be configured to support 5G radio access technologies. Alternatively, the primary base station 205 may be a gNB, while the secondary base station 220 may be an eNB. Each base station may have a different coverage area. For example, the primary base station 205 and the target base station 210 may have different coverage areas from the secondary base station 220. Thus, an MN and SN have different coverage areas.

The UE 215 may communicate with the primary base station 205 and a secondary base station 220 over communication links 125, as described in FIG. 1. The primary base station 205, the target base station 210, and the secondary base station 220 may interface through one or more backhaul links 120 (e.g., via an S1, N2, N3, or other interface). That is, the primary base station 205, the target base station 210, and the secondary base station 220 may communicate with one another over the backhaul links 120 (e.g., via an X2, Xn, or other interface) either directly (e.g., directly between base stations 105), or indirectly (e.g., via a core network), or both. In some examples, the backhaul links 120 may be or include one or more wireless links.

In the wireless communications system 200, the UE 215 may operate according to one or more operating states (also referred to as RRC states). In some examples, the UE 215 may operate according to one or more operating states based on data traffic in the wireless communications system 200. For example, the UE 215 may operate in an RRC active state when data traffic is high (e.g., above a threshold) for the UE 215, or in the wireless communications system 200, or both. In some other examples, the UE 215 may operate in an RRC inactive state when data traffic is low (e.g., below a threshold) for the UE 215, or in the wireless communications system 200, or both. In the RRC inactive state, the UE 215 may experience reduced signaling overhead, decreased power consumption, among other examples.

When an MN changes, it may be possible to keep an SN unchanged. For example, an MN for the UE 215 may change from the primary base station 205 to the target base station 210. In some cases, an MN change without SN change may be supported for handover occasion but not supported for a connection resume occasion (e.g., an RRC resume). An inter MN resume procedure and an inter MN handover procedure may be similar, however, the key difference is in the UE context transfer. The handover procedure includes using a handover request message to transfer UE context, while the resume procedure includes using a retrieve UE context procedure to transfer the UE context.

In the example of FIG. 2, the UE 215 may, in some examples, resume a connection with the primary base station 205. However, in some other examples, the UE 215 may resume a connection on a different base station (e.g., a different MN). For example, the UE 215 may resume a connection with the target base station 210. In this example, it may be desirable for the primary base station 205 (e.g., a last serving base station) to share UE context information with the target base station 210. Various aspects of the present disclosure thus relate to the primary base station 205 (e.g., a last serving base station) sharing UE context information including SN information with the target base station 210.

The target base station 210 may receive, from the UE 215, a resume request message or a re-establishment request message via communication link 125. For example, the target base station 210 may receive, from the UE 215, an RRC resume request message or an RRC re-establishment request message via communication link 125. In response, the target base station 210 may transmit a context request message (e.g., retrieve UE context request message) to the primary base station 205 via backhaul link 120, which may respond with a context response message (e.g., retrieve UE context response message) that includes SN information 225. For example, the primary base station 205 may include the SN information 225 in an IE (e.g., UE Context Reference at the S-NG-RAN node IE) in the context response message (e.g., retrieve UE context response message). The context response message may also include a global identifier (e.g., a global NG-RAN Node identifier and an S-NG-RAN node UE XNAP identifier). In some examples, if the UE Context Reference at the S-NG-RAN IE is included in the retrieve UE context response message, the target base station 210 (e.g., the new NG-RAN node) may use it to establish dual connectivity with the secondary base station 220 (e.g., the S-NG-RAN node). In this case, the primary base station 205 (e.g., the old NG-RAN node) may expect the target base station 210 (e.g., the new NG-RAN node) to include a UE Context kept indicator IE set to "True" in the retrieve UE context confirm message, as described herein.

The target base station 210 can use the SN information 225 to determine whether to maintain or release the secondary base station 220 for the UE 215. This shared SN information 225 may thereby support the target base station 210 to maintain the same secondary base station, and as a result may improve delta signaling towards the UE 215 for the secondary base station 220 during a connection resume and help in faster data path establishment if the secondary base station 220 is retained at the target base station 210. Therefore, in the wireless communications system 200, the same SN can be added or re-added upon RRC resume or RRC reestablishment on a different MN.

Additionally, or alternatively, the primary base station 205 and the target base station 210 may perform a retrieve UE context confirm procedure to confirm that the secondary base station 220 (e.g., an S-NG-RAN node) is reused by the target base station 210 (e.g., a new NG-RAN node) after UE context retrieval. The primary base station 205 and the target base station 210 may perform a retrieve UE context confirm procedure using UE-associated signaling. The target base station 210 (e.g., the new NG-RAN node) may initiate the procedure by sending the context confirm message 230 (e.g., retrieve UE context confirm message) to the primary base station 205 (e.g., the old NG-RAN node), when the secondary base station 220 (e.g., an S-NG-RAN node) is reused by the target base station 210 (e.g., a new NG-RAN node) after UE context retrieval. That is, context confirm message 230 sent by the new NG-RAN node to the old NG-RAN node indicates that the S-NG-RAN node is not released. Otherwise, if the context confirm message 230 refers to a context that does not exist, the primary base station 205 (e.g., the old NG-RAN node) shall ignore the message 230. In some examples, if any DRBs of the secondary base station 220

(e.g., an S-NG-RAN node) is moved to the target base station 210 (e.g., a new NG-RAN node), the DRBs transferred to MN IE is included in the context confirm message 230. The primary base station 205 (e.g., the old NG-RAN node) uses this information in data forwarding.

By way of example, the target base station 210 may transmit, to the primary base station 205, the context confirm message 230 (e.g., retrieve UE context confirm message) to confirm transfer of UE context information and maintain the secondary base station 220 for the UE 215. In some examples, the context confirm message 230 may include an indication of maintaining or releasing the secondary base station 220. In some other examples, the context confirm message 230 may include an indication of transferring one or more radio bearers from the primary base station 205. For example, the context confirm message 230 may include a list of DRBs transferred to the target base station 210 from the primary base station 205. In other examples, the context confirm message 230 may include an indication of transferring one or more PDU session resources and data forwarding information from the primary base station 205 (e.g., a last serving base station). For example, the context confirm message 230 may include one or more PDU session resources admitted by the target base station 210 along with data forwarding information.

Additionally or alternatively, in the example of FIG. 2, the UE 215 may determine to keep an SCG configuration, for example, associated with the secondary base station 220. In some examples, if the UE 215 determines to keep (e.g., store) the SCG configuration then the UE 215 may transmit, and the target base station 210 may receive, an RRC re-establishment request message, which may include an indication (e.g., SCG indication 235) that the UE 215 kept the SCG configuration. In other words, the UE 215 did not discard the SCG configuration as described in more detail with reference to FIGS. 5 through 7.

Figure 3:
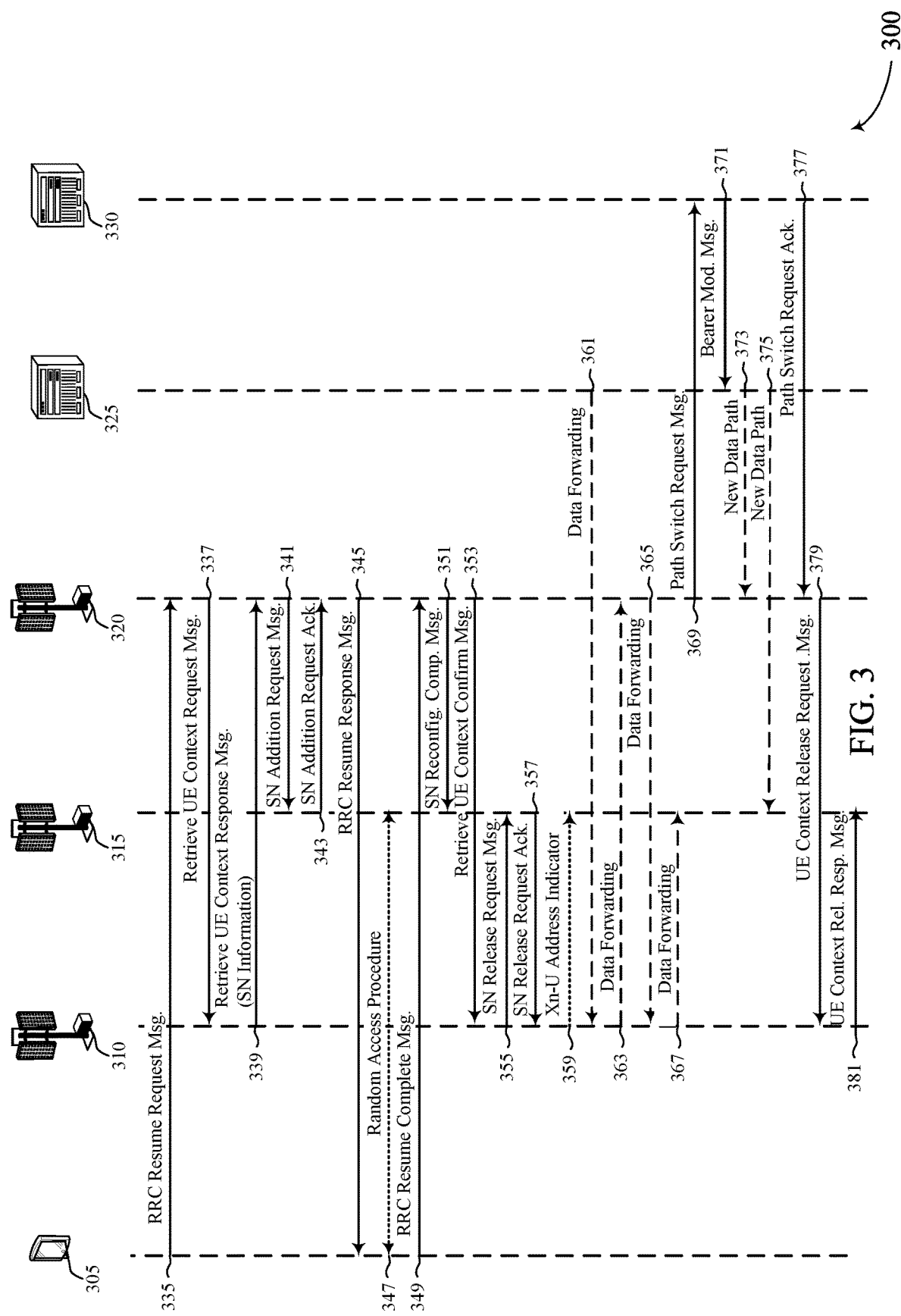
FIGS. 3 through 7 illustrates examples of process flows that support techniques for wireless communications with a MN in an MCG without a change in a SN in a SCG in accordance with various aspects of the present disclosure.

FIG. 3 illustrates an example of a process flow 300 that supports techniques for wireless communications with a MN in an MCG without a change in a SN in a SCG in accordance with various aspects of the present disclosure. The process flow 300 may implement aspects of the wireless communications system 100 and the wireless communications system 200 described with reference to FIGS. 1 and 2, respectively. The process flow 300 may promote power saving for a UE 305. The process flow 300 may also promote high reliability and low latency wireless communications, among other benefits, for the UE 305. The process flow 300 may support multiple radio access technologies including 4G systems such as LTE systems, LTE-A systems, or LTE-A Pro systems, and 5G systems, which may be referred to as NR systems.

In the following description of the process flow 300, the operations between the UE 305, a primary base station 310 (also referred to as a last serving base station or a last serving MN), a secondary base station 315 (also referred to as an SN), a target base station 320 (also referred to as a target MN), a user plane function (UPF) 325, and an access and mobility management function (AMF) 330 may be transmitted in a different order than the example order shown, or the operations performed by the UE 305, the primary base station 310, the secondary base station 315, the target base station 320, the UPF 325, and the AMF 330 may be performed in different orders or at different times. Some operations may also be omitted from the process flow 300, and other operations may be added to the process flow 300. The UE 305, the primary base station 310, the secondary base station 315, the target base station 320, the UPF 325, and the AMF 330 may be examples of corresponding devices as described with reference to FIGS. 1 and 2, respectively.

At 335, the UE 305 may transmit an RRC resume request message (or an RRC reestablishment request message) to the target base station 320. At 337, the target base station 320 may transmit a retrieve UE context request message to the primary base station 310. At 339, the target base station 320 may transmit, in response to the retrieve UE context request message, a retrieve UE context response message, which may include SN information associated with the secondary base station 315. At 341, the target base station 320 may transmit an SN addition request message (with a previous identifier (e.g., an old SnXNAPID)) to the secondary base station 315. At 343, the secondary base station 315 may transmit, in response to the SN addition request message, an SN addition request acknowledgment message (also referred to as an SN addition response message), which may include an SCG radio bearer configuration (also referred to as SCG_RB_Config) or an SCG configuration (also referred to as SCG_Config).

At 345, the target base station 320 may transmit an RRC resume response message (or an RRC reconfiguration message during an RRC reestablishment procedure) to the UE 305. At 347, the UE 305 and the secondary base station 315 may perform a random access procedure (e.g., a synchronization procedure, etc.) to establish a connection between the UE 305 and the secondary base station 315. At 349, the UE 305 may transmit an RRC resume complete message (or an RRC reconfiguration complete message during an RRC reestablishment procedure) to the target base station 320. At 351, the target base station 320 may transmit an SN reconfiguration complete message to the secondary base station 315. At 353, the target base station 320 may transmit a retrieve UE context confirm message to the primary base station 310. In some cases, a handover request message includes UE context reference at a S-NG-RAN node (with SN node ID and SN XnAP UE ID) for a target MN to send SN addition request to the same SN. The process flow 300 may add the same IE into the retrieve UE context response message. The retrieve UE context confirm message transmitted at 353 may include an indication (also referred to as a SN_UE_Context_Kept_Indicator) of maintaining or releasing the secondary base station 315. In some other examples, the retrieve UE context confirm message transmitted at 353 may include an indication of transferring one or more radio bearers from the secondary base station 315 to the target base station 320. In other examples, the retrieve UE context confirm message transmitted at 353 may include an indication of transferring one or more PDUs session resources and data forwarding information from the primary base station 310.

At 355, the primary base station 310 may transmit an SN release request message to the secondary base station 315, which may include an indication of the UE context indicator and DRBs transferred to the target base station 320. At 357, the secondary base station 315 may transmit, in response to the SN release request message, an SN release acknowledgment (also referred to as an SN release response message) to the primary base station 310. At 359, the primary base station 310 may transmit an Xn-U address indicator (e.g., forwarding information for SN-T bearers moving to the target base station 320) to the secondary base station 315. At 361 and 363, the UPF 325 and the primary base station 310 may perform data forwarding for MN-T bearers. At 365 and 367, the UPF 325 and the secondary base station 315 may perform data forwarding for SN-T bearers moving to the target base station 320.

At 369, the target base station 320 may transmit a path switch request message to the AMF 330. At 371, the AMF 330 may transmit, in response to the path switch request message, a bearer modification message to the UPF 325. At 373, the UPF 325 may switch a data path for one or more MN terminated bearers to the target base station 320. At 375, the UPF 325 may switch a data path for one or more SN terminated bearers to the secondary base station 315. At 377, the AMF 330 may transmit a path switch request acknowledgement (also referred to as a path switch response message) to the target base station 320. At 379, the target base station 320 may transmit a UE context release request message to the primary base station 310. At 381, the primary base station 310 may transmit a UE context release response message to the secondary base station 315.

Figure 4:
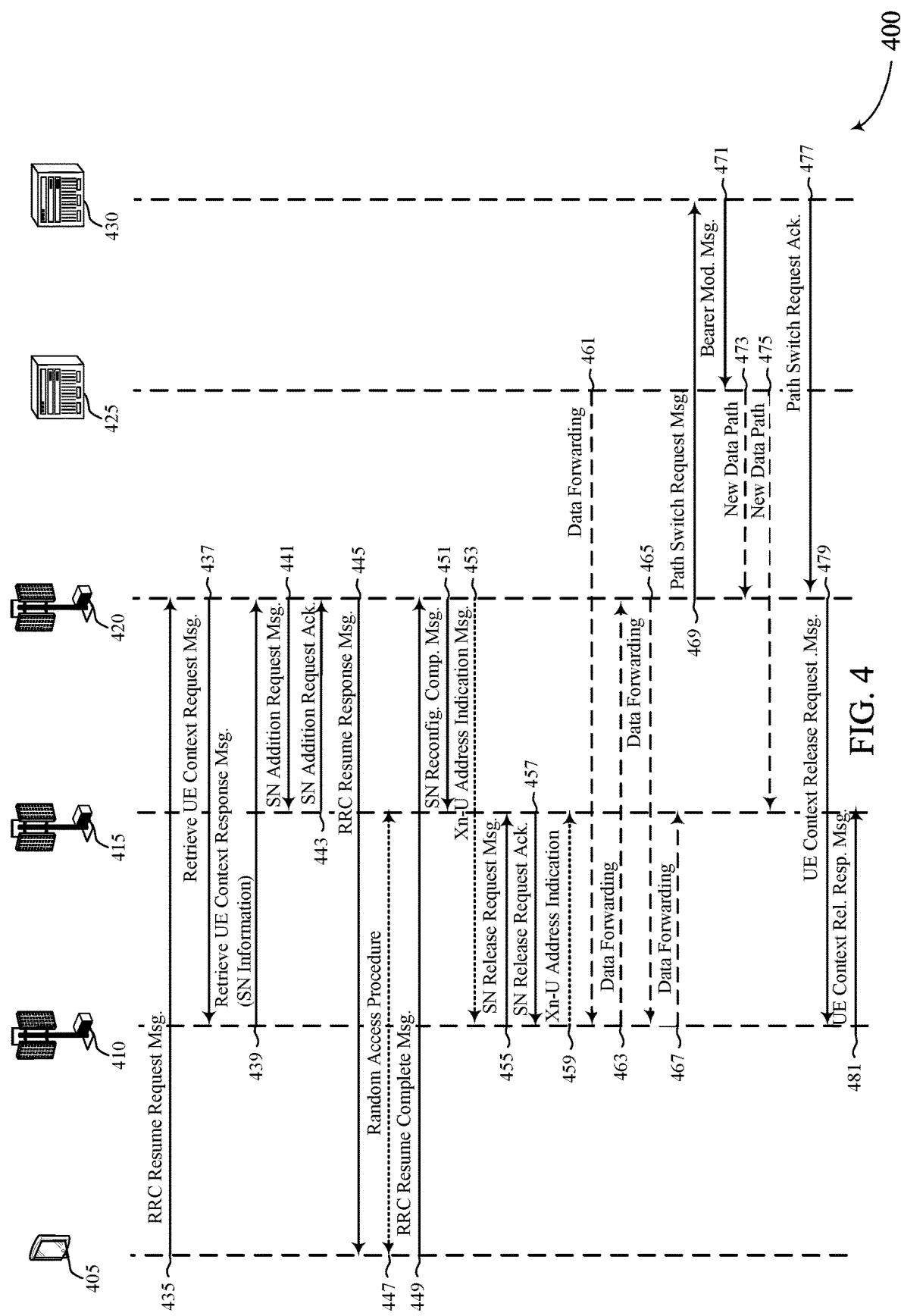

FIG. 4 illustrates an example of a process flow 400 that supports techniques for wireless communications with a MN in an MCG without a change in a SN in a SCG in accordance with various aspects of the present disclosure. The process flow 400 may implement aspects of the wireless communications system 100 and the wireless communications system 200 described with reference to FIGS. 1 and 2, respectively. The process flow 400 may promote power saving for a UE 405. The process flow 400 may also promote high reliability and low latency wireless communications, among other benefits, for the UE 405. The process flow 400 may support multiple radio access technologies including 4G systems such as LTE systems, LTE-A systems, or LTE-A Pro systems, and 5G systems, which may be referred to as NR systems.

In the following description of the process flow 400, the operations between the UE 405, a primary base station 410 (also referred to as a last serving base station or a last serving MN), a secondary base station 415 (also referred to as a SN), a target base station 420 (also referred to as a target MN), a UPF 425, and an AMF 430 may be transmitted in a different order than the example order shown, or the operations performed by the UE 405, the primary base station 410, the secondary base station 415, the target base station 420, the UPF 425, and the AMF 430 may be performed in different orders or at different times. Some operations may also be omitted from the process flow 400, and other operations may be added to the process flow 400. The UE 405, the primary base station 410, the secondary base station 415, the target base station 420, the UPF 425, and the AMF 430 may be examples of corresponding devices as described with reference to FIGS. 1 and 2, respectively.

At 435, the UE 405 may transmit an RRC resume request message (or an RRC reestablishment request message) to the target base station 420. At 437, the target base station 420 may transmit a retrieve UE context request message to the primary base station 410. At 439, the target base station 420 may transmit, in response to the retrieve UE context request message, a retrieve UE context response message, which may include SN information associated with the secondary base station 415. At 441, the target base station 420 may transmit an SN addition request message (with a previous identifier (e.g., an old SnXNAPID)) to the secondary base station 415. At 443, the secondary base station 415 may transmit, in response to the SN addition request message, an SN addition request acknowledgment message (also referred to as an SN addition response message), which may include an SCG radio bearer configuration (also referred to as SCG_RB_Config) or an SCG configuration (also referred to as SCG_Config).

At 445, the target base station 420 may transmit an RRC resume response message (or an RRC reconfiguration message during an RRC reestablishment procedure) to the UE 405. At 447, the UE 405 and the secondary base station 415 may perform a random access procedure (e.g., a synchronization procedure, etc.) to establish a connection between the UE 405 and the secondary base station 415. At 449, the UE 405 may transmit an RRC resume complete message (or an RRC reconfiguration complete message during an RRC reestablishment procedure) to the target base station 420. At 451, the target base station 420 may transmit an SN reconfiguration complete message to the secondary base station 415. At 453, the target base station 420 may transmit, to the primary base station 410, an Xn-U address indication message to share data forwarding information with the primary base station 410.

At 455, the primary base station 410 may transmit an SN release request message to the secondary base station 415. At 457, the secondary base station 415 may transmit, in response to the SN release request message, an SN release acknowledgment (also referred to as an SN release response message) to the primary base station 410. At 459, the primary base station 410 may transmit an Xn-U address indicator (e.g., forwarding information for SN-T bearers moving to the target base station 420) to the secondary base station 415. Thus, the primary base station 410 may transmit (e.g., forward) the Xn-U address indication message to the secondary base station 415 to begin direct forwarding of data from the secondary base station 415 to the target base station 420.

At 461 and 463, the UPF 425 and the primary base station 410 may perform data forwarding for MN-T bearers. At 465 and 467, the UPF 425 and the secondary base station 415 may perform data forwarding for SN-T bearers moving to the target base station 420. At 469, the target base station 420 may transmit a path switch request message to the AMF 430. At 471, the AMF 430 may transmit, in response to the path switch request message, a bearer modification message to the UPF 425. At 473, the UPF 425 may switch a data path for MN terminated bearers to the target base station 420. At 475, the UPF 425 may switch the data path for SN terminated bearers to the secondary base station 415. At 477, the AMF 430 may transmit a path switch request acknowledgement (also referred to as a path switch response message) to the target base station 420. At 479, the target base station 420 may transmit a UE context release request message to the primary base station 410. At 481, the primary base station 410 may transmit a UE context release response message to the secondary base station 415.

Figure 5:
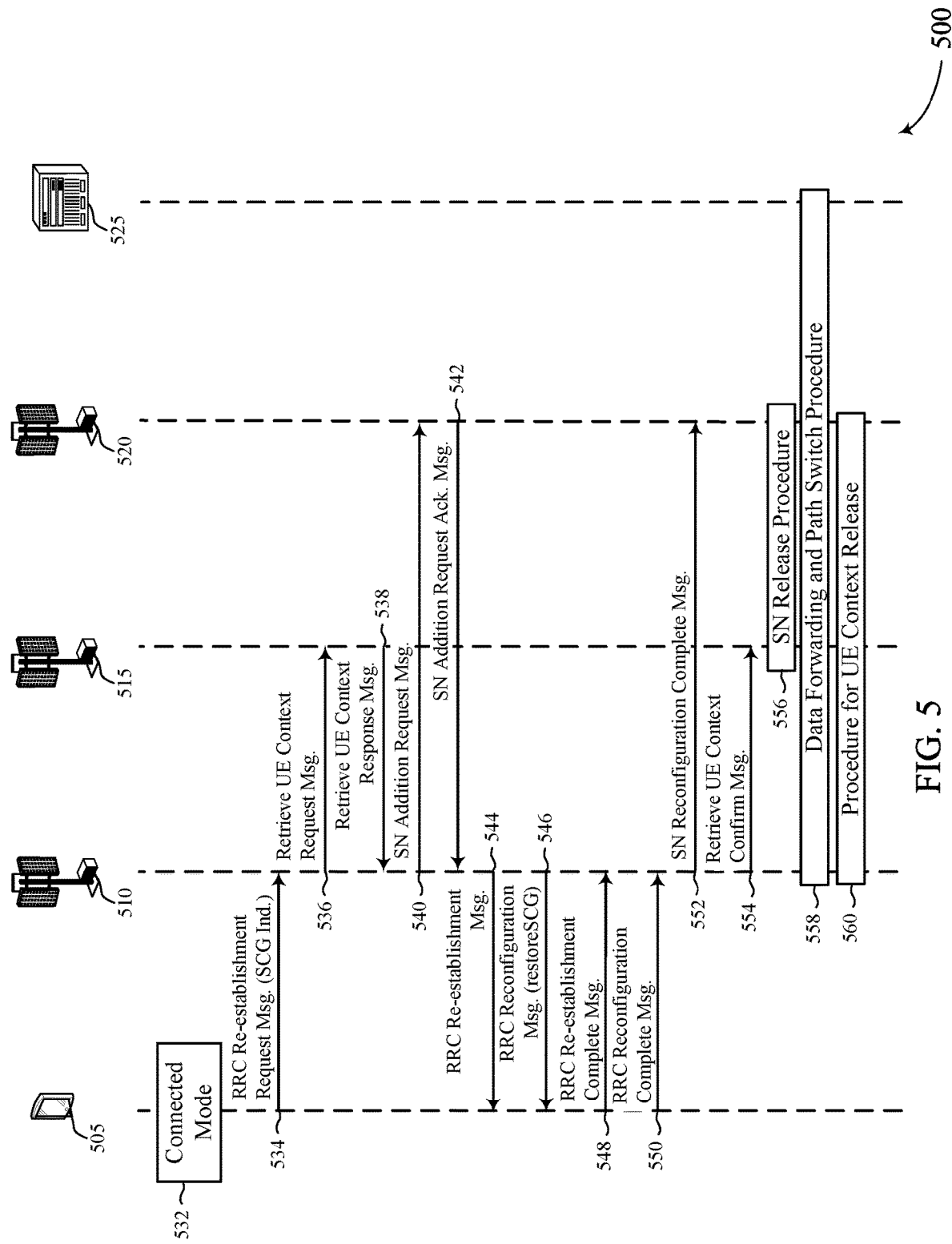

FIG. 5 illustrates an example of a process flow 500 that supports techniques for wireless communications with a MN in an MCG without a change in a SN in a SCG in accordance with various aspects of the present disclosure. The process flow 500 may implement or be implemented by aspects of the wireless communications system 200 and the wireless communications system 200 described with reference to FIGS. 1 and 2, respectively. The process flow 500 may support multiple radio access technologies including 5G systems such as LTE systems, LTE-A systems, or LTE-A Pro systems, and 5G systems, which may be referred to as NR systems. In the example of FIG. 5, the process flow 500 may support an inter-MN RRC re-establishment procedure without a change to a SN. In some examples, the process flow 500 may promote power saving for a UE 505. In some other examples, the process flow 500 may promote high reliability and low latency wireless communications for the UE 505.

In the following description of the process flow 500, the operations between the UE 505, a target base station 510 (also referred to as a target MN), a primary base station 515 (also referred to as a last serving base station or a last serving MN), a secondary base station 520 (also referred to as a SN), and a network entity 525 (e.g., one or both of a UPF or an AMF) may be transmitted in a different order than the example order shown, or the operations performed by the UE 505, the target base station 510, the primary base station 515, the secondary base station 520, and the network entity 525 may be performed in different orders or at different times. Some operations may also be omitted from the process flow 500, and other operations may be added to the process flow 500. The UE 505, the target base station 510, the primary base station 515, the secondary base station 520, and the network entity 525 may be examples of corresponding devices as described with reference to FIGS. 1 and 2, respectively.

In some cases, the UE 505 may support an RRC procedure (e.g., an RRC MCG failure information procedure) to enable recovery from a primary link failure (e.g., an MCG link failure) via a secondary link (e.g., an SN link). In some examples, if the UE 505 determines that an SN link is available, the UE 505 may support the RRC procedure to enable recovery from a primary link failure via the secondary link. In some cases, the UE 505 may determine a cause for a primary link failure (e.g., an MCG link failure cause) for which the RRC procedure is triggered. The cause may be a layer failure associated with a primary link. For example, an MCG layer radio link failure (RLF) may include a PHY, MAC, or RLC layer RLF.

The UE 505 may trigger an RRC procedure, such as an RRC re-establishment procedure based on an RRC reconfiguration failure, which may be due to a primary link failure. In some other examples, the UE 505 may trigger an RRC procedure, such as an RRC re-establishment procedure based on an integrity check failure, which may be due to a primary link failure. In other examples, the UE 505 may trigger a procedure, such as an RRC re-establishment procedure based on a handover failure (e.g., an intra-radio access technology handover or an inter-radio access technology handover), which may be due to a primary link failure. Although a link failure (e.g., due to one or more of the above examples) may occur on an MCG link, an SCG link may still be suitable for the UE 505. For example, if the UE 505 fails to apply an MCG RRC configuration or there is an error in the provided MCG RRC configuration, the UE 505 may determine to keep a SN and an SCG configuration when initiating an RRC procedure, such as an RRC re-establishment procedure.

In the example of FIG. 5, the UE 505 may detect an MCG link failure due to one or more of the examples described above, and the UE 505 may, based on the detected MCG link failure, initiate an RRC re-establishment procedure and perform cell reselection procedure. During the cell reselection procedure, the UE 505 may select a cell to perform a random access procedure (e.g., a random access channel (RACH) procedure) and RRC re-establishment procedure. In some examples, based on measurements (e.g., channel state information (CSI) measurements, RRM measurements (e.g., reference signal received power (RSRP), a reference signal received quality (RSRQ)) performed by the UE 505 on an SN (e.g., the secondary base station 520) or if the UE 505 determines that an SCG link associated with the SN can operate without any issues (e.g., link quality above a threshold), the UE 505 may determine to keep the SN and the SCG configuration associated with the SN.

At 532, the UE 505 may be in a connected mode (e.g., an RRC connected mode, a connection management (CM) connected mode). The UE 505 may determine an MCG link failure associated with the primary base station 515, while in the connected mode. In some examples, upon detecting the MCG link failure due to one more examples described herein, the UE 505 may initiate an RRC re-establishment procedure. The UE 505 may determine to keep an SCG configuration, for example, associated with the secondary base station 520. In some examples, if the UE 505 determines to keep (e.g., store) the SCG configuration then, at 534, the UE 505 may transmit, and the target base station 510 may receive, an RRC re-establishment request message, which may include an indication (e.g., SCG kept indication) that the UE 505 kept the SCG configuration. In other words, the UE 505 did not discard the SCG configuration.

At 536, the target base station 510 may transmit, and the primary base station 515 may receive, a retrieve UE context message. For example, based on the received RRC re-establishment request message, the target base station 510 may transmit, to the primary base station 515, the retrieve UE context message. At 538, the primary base station 515 may transmit, and the target base station 510 may receive, a retrieve UE context response message. For example, based on the retrieve UE context message, the primary base station 515 may transmit, to the target base station 510, the retrieve UE context response message. In some examples, the UE 505 may be configured with a multi-radio dual-connectivity (MR-DC) configuration before the UE 505 initiates the RRC re-establishment procedure. If the UE 505 is configured with the MR-DC configuration prior to the UE 505 initiating the RRC re-establishment procedure, a source MN (e.g., the primary base station 515) may include a reference to the UE context at a SN (e.g., a last serving SN), such as the secondary base station 520. The reference may include one or both of a source SN identifier (ID) or an SN UE X2AP/XnAP ID. For example, the primary base station 515 may transmit, and the target base station 510 may receive, a retrieve UE context response message, which may include a reference to UE context at an SN (e.g., the secondary base station 520).

In some examples, if one or both the UE 505 provides an indication (e.g., SCG kept indication) that the UE 505 saved the SCG configuration or the retrieve UE context response message includes a reference to the UE context at an SN (e.g., the secondary base station 520), the target base station 510 may determine to keep the secondary base station 520 as an SN for the UE 505. If the target base station 510 determines to keep the SN for the UE 505, the target base station 510 may perform an SN addition procedure with the secondary base station 520, which provides the target base station 510 with the SCG configuration for the UE 505. For example, at 540, the target base station 510 may transmit, and the secondary base station 520 may receive, an SN addition request message, which may include the reference to the UE context at the secondary base station 520. At 542, the secondary base station may transmit, and the target base station 510 may receive, an SN addition request acknowledgement, which may include the SCG configuration.

At 544, the target base station 510 may transmit, and the UE 505 may receive, an RRC re-establishment message. At 546, the target base station 510 may transmit, and the UE 505 may receive an RRC reconfiguration message, which may include an indication (e.g., restoreSCG) to restore an SCG link, for example, associated with the secondary base station 520. Additionally, the RRC reconfiguration message may include one or both of an MCG configuration or the SCG configuration. One or both of the MCG configuration or the SCG configuration may be a complete or delta configuration (e.g., a partial or a modified MCG configuration or SCG configuration). In some examples, if the indication (e.g., restoreSCG) is not received in the RRC reconfiguration message after the RRC reestablishment message, the UE 505 may discard the previous SCG configuration and apply a new SCG configuration if the new SCG configuration is received in the RRC reconfiguration message. In some other examples, if the indication (e.g., restoreSCG) is received in the RRC reconfiguration message after the RRC reestablishment message, the UE 505 may apply the new SCG configuration received in the RRC reconfiguration message and then discard the previous SCG configuration.

At 548, the UE 505 may transmit, and the target base station 510 may receive, an RRC re-establishment complete message. At 550, the UE 505 may transmit, and the target base station 510 may receive, an RRC reconfiguration complete message, which may include an SN reconfiguration response. As such, if the SCG configuration is received in the RRC reconfiguration message, the UE 505 may include, in the RRC reconfiguration complete message, an SN reconfiguration complete message if the UE 505 successfully applied the provided SCG configuration. The UE 505 may be provided with new SN security keys during the RRC procedure (e.g., in the RRC reconfiguration message). The UE 505 may perform a RACH procedure to access the secondary base station 520. At 552, the target base station 510 may transmit, and the secondary base station 520 may receive, an SN reconfiguration complete message. At 554, the target base station 510 may transmit, and the primary base station 515 may receive, a retrieve UE context confirm message, which may include one or more of an SN UE context kept indication, an indication that a DRB moved to an MN, or a PDU session admitted list.

At 556, one or more of the primary base station 515 and the secondary base station 520 may perform an SN release procedure. At 558, one or more of the target base station 510, the primary base station 515, the secondary base station 520, or the network entity 525 may perform data forwarding and path switch procedures. At 560, one or more of the target base station 510, the primary base station 515, or the secondary base station 520 may perform one or more procedures for UE context release at the primary base station 515 (e.g., S-MN) and the secondary base station 520 (e.g., S-SN).

Figure 6:
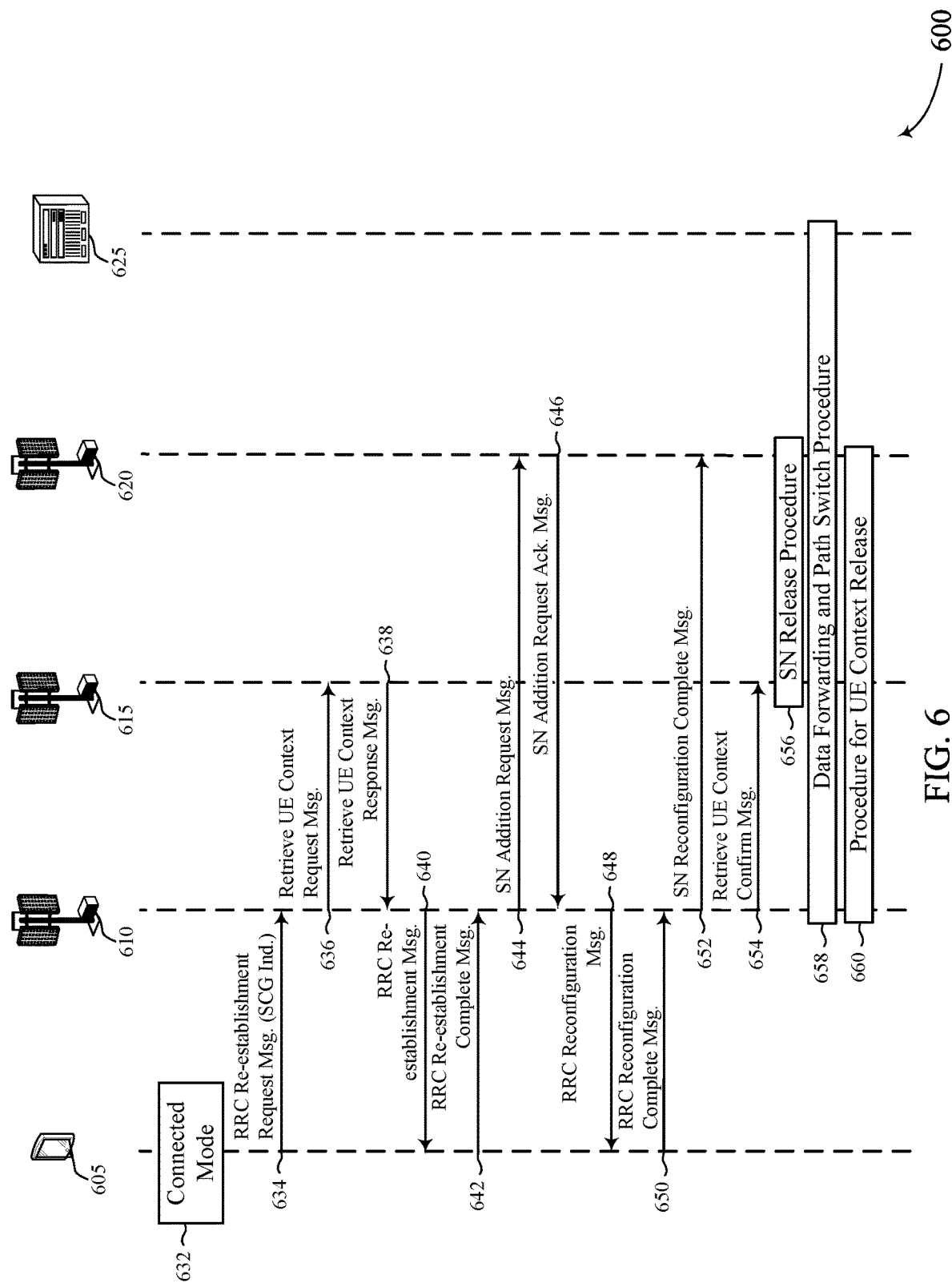

FIG. 6 illustrates an example of a process flow 600 that supports techniques for wireless communications with a MN in an MCG without a change in a SN in a SCG in accordance with various aspects of the present disclosure. The process flow 600 may implement or be implemented by aspects of the wireless communications system 200 and the wireless communications system 200 described with reference to FIGS. 1 and 2, respectively. The process flow 500 may support multiple radio access technologies including 5G systems such as LTE systems, LTE-A systems, or LTE-A Pro systems, and 5G systems, which may be referred to as NR systems. In the example of FIG. 6, the process flow 600 may support an inter-MN RRC re-establishment procedure without a change to a SN. In some examples, the process flow 600 may promote power saving for a UE 605. In some other examples, the process flow 600 may also promote high reliability and low latency wireless communications for the UE 605.

In the following description of the process flow 600, the operations between the UE 605, a target base station 610 (also referred to as a target MN), a primary base station 615 (also referred to as a last serving base station or a last serving MN), a secondary base station 620 (also referred to as a SN), and a network entity 525 (e.g., one or both of a UPF or an AMF) may be transmitted in a different order than the example order shown, or the operations performed by the UE 605, the target base station 610, the primary base station 615, the secondary base station 620, and the network entity 625 may be performed in different orders or at different times. Some operations may also be omitted from the process flow 600, and other operations may be added to the process flow 600. The UE 605, the target base station 610, the primary base station 615, the secondary base station 620, and the network entity 625 may be examples of corresponding devices as described with reference to FIGS. 1 and 2, respectively.

In some cases, the UE 605 may support an RRC procedure (e.g., an RRC MCG failure information procedure) to enable recovery from a primary link failure (e.g., an MCG link failure) via a secondary link (e.g., an SN link). In some examples, if the UE 605 determines that an SN link is available, the UE 605 may support the RRC procedure to enable recovery from a primary link failure via the secondary link. In some cases, the UE 505 may determine a cause for a primary link failure (e.g., an MCG link failure cause) for which the RRC procedure is triggered. The cause may be a layer failure associated with a primary link. For example, an MCG layer RLF may include a PHY, MAC, or RLC layer RLF.

The UE 605 may trigger an RRC procedure, such as an RRC re-establishment procedure based on an RRC reconfiguration failure, which may be due to a primary link failure. In some other examples, the UE 605 may trigger an RRC procedure, such as an RRC re-establishment procedure based on an integrity check failure, which may be due to a primary link failure. In other examples, the UE 605 may trigger a procedure, such as an RRC re-establishment procedure based on a handover failure (e.g., an intra-radio access technology handover or an inter-radio access technology handover), which may be due to a primary link failure. Although a link failure (e.g., due to one or more of the above examples) may occur on an MCG link, an SCG link may still be suitable for the UE 605. For example, if the UE 605 fails to apply an MCG RRC configuration or there is an error in the provided MCG RRC configuration, the UE 605 may determine to keep an SN and an SCG configuration when initiating an RRC procedure, such as an RRC re-establishment procedure.

In the example of FIG. 6, the UE 605 may detect an MCG link failure due to one or more of the examples described above, and the UE 605 may, based on the detected MCG link failure, initiate an RRC re-establishment procedure and perform cell reselection procedure. During the cell reselection procedure, the UE 605 may select a cell to perform a random access procedure (e.g., a RACH procedure) and an RRC re-establishment procedure. Based on measurements (e.g., RRM measurements) performed by the UE 605 on an SN (e.g., the secondary base station 620) or if the UE 605 determines that an SCG link associated with the SN can operate without any issues, the UE 605 may determine to keep the secondary base station 620 and the SCG configuration associated with the SN. Additionally, in the example of FIG. 6, if a target MN (e.g., the target base station 610) also determines to keep the SN (e.g., the secondary base station 620), the target MN may transmit, and the UE 605 may receive, a request to provide measurement results (e.g., RSRQ/RSRP results) to the target MN, which may share the RSRQ/RSRP results with the SN. The SN may use the measurement results to determine the SCG configuration to be provided to the UE 605.

At 632, the UE 605 may be in a connected mode (e.g., an RRC connected mode, a CM connected mode). The UE 605 may determine an MCG link failure associated with the primary base station 615, while in the connected mode. In some examples, based on the detected MCG link failure due to one more examples described herein, the UE 605 may initiate an RRC re-establishment procedure. In some examples, the UE 605 may determine to keep an SCG configuration, for example, associated with the secondary base station 620. In some examples, if the UE 605 determines to keep (e.g., store) the SCG configuration then, at 634, the UE 605 may transmit, and the target base station 610 may receive, an RRC re-establishment request message, which may include an indication (e.g., SCG kept indication) that the UE 605 kept the SCG configuration. In other words, the UE 605 refrains from discarding the SCG configuration.

At 636, the target base station 610 may transmit, and the primary base station 615 may receive, a retrieve UE context message. For example, based on the received RRC re-establishment request message, the target base station 610 may transmit, to the primary base station 615, the retrieve UE context message. At 638, the primary base station 615 may transmit, and the target base station 610 may receive, a retrieve UE context response message. For example, based on the retrieve UE context message, the primary base station 615 may transmit, to the target base station 610, the retrieve UE context response message. In some examples, the UE 505 may be configured with an MR-DC configuration before the UE 605 initiates the RRC re-establishment procedure. If the UE 605 is configured with the MR-DC configuration prior to the UE 605 initiating the RRC re-establishment procedure, a source MN (e.g., the primary base station 615) may include a reference to the UE context at a SN (e.g., a last serving SN), such as the secondary base station 620.

In some examples, if one or both the UE 605 provides an indication (e.g., SCG kept indication) that the UE 605 saved the SCG configuration or the retrieve UE context response message includes a reference to the UE context at an SN (e.g., the secondary base station 620), the target base station 610 may determine to keep the secondary base station 620 as an SN for the UE 605. If the target base station 610 determines to keep the secondary base station 620 as the SN for the UE 605, then at 640, the target base station 610 may transmit, and the UE 605 may receive, an RRC re-establishment message, which may include a request for measurement results (e.g., RRM results) from the UE 605. At 642, the UE 605 may transmit, and the target base station 610 may receive, an RRC re-establishment complete message, which may include an indication of measurement results and the actual measurement results.

The target base station 610 may perform an SN addition procedure with the secondary base station 620, which provides the target base station 610 with the SCG configuration for the UE 605. For example, at 644, the target base station 610 may transmit, and the secondary base station 620 may receive, an SN addition request message, which may include the reference to the UE context at the secondary base station 620, as well as the measurement results (e.g., RRM results) provided by the UE 605. At 646, the secondary base station 620 may transmit, and the target base station 610 may receive, an SN addition request acknowledgement message, which may include the SCG configuration. As such, the target base station 610 may perform the SN addition procedure with the secondary base station 620 after it receives the measurement results from the UE 605.

At 648, the target base station 610 may transmit, and the UE 605 may receive, an RRC reconfiguration message, which may include an indication (e.g., restoreSCG) to restore a link with the secondary base station 620. Additionally, the RRC reconfiguration message may include one or both of an MCG configuration or an SCG configuration. One or both of the MCG configuration or the SCG configuration may be a complete or delta configuration (e.g., a partial or a modified MCG configuration or SCG configuration). At 650, the UE 605 may transmit, and the target base station 610 may receive, an RRC re-establishment complete message.

At 652, the target base station 610 may transmit, and the secondary base station 620 may receive, an SN reconfiguration complete message. At 654, the target base station 610 may transmit, and the primary base station 615 may receive, a retrieve UE context confirm message, which may include one or more of an SN UE context kept indication, an indication that a DRB moved to an MN, or a PDU session admitted list.

At 656, one or more of the primary base station 615 and the secondary base station 620 may perform an SN release procedure. At 658, one or more of the target base station 610, the primary base station 615, the secondary base station 620, or the network entity 625 may perform data forwarding and path switch procedures. At 660, one or more of the target base station 610, the primary base station 615, or the secondary base station 620 may perform one or more procedures for UE context release at the primary base station 615 (e.g., S-MN) and the secondary base station 620 (e.g., S-SN).

Figure 7:
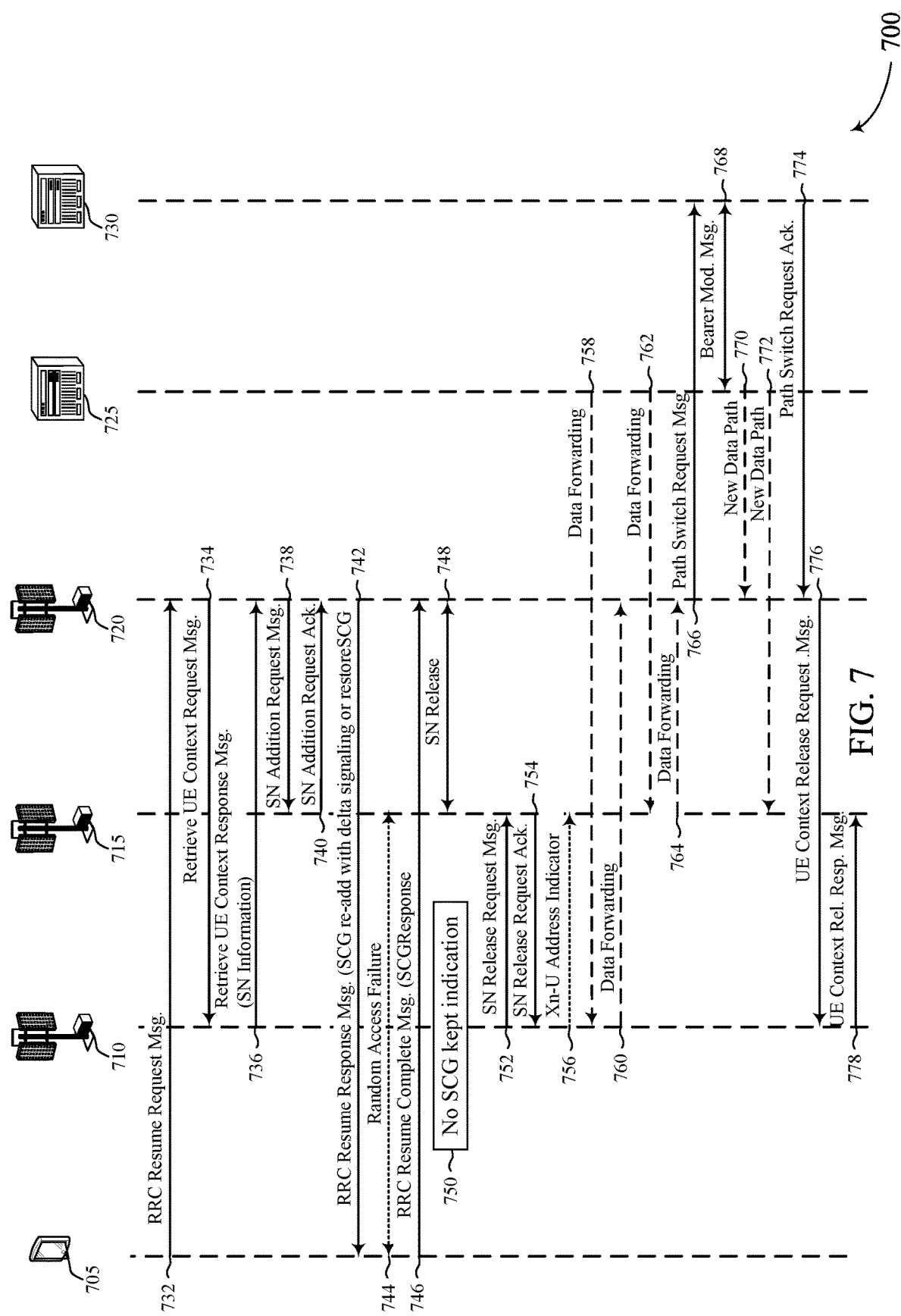

FIG. 7 illustrates an example of a process flow 700 that supports techniques for wireless communications with a MN in an MCG without a change in a SN in a SCG in accordance with various aspects of the present disclosure. The process flow 700 may implement or be implemented by aspects of the wireless communications system 100 and the wireless communications system 200 described with reference to FIGS. 1 and 2, respectively. For example, the process flow 700 may support multiple radio access technologies including 4G systems such as LTE systems, LTE-A systems, or LTE-A Pro systems, and 5G systems, which may be referred to as NR systems. In some examples, the process flow 700 may promote power saving for a UE 705. In some other examples, the process flow 700 may promote high reliability and low latency wireless communications for the UE 705.

In the following description of the process flow 700, the operations between the UE 705, a primary base station 710 (also referred to as a last serving base station or a last serving MN), a secondary base station 715 (also referred to as an SN), a target base station 720 (also referred to as a target MN), a UPF 725, and an AMF 730 may be transmitted in a different order than the example order shown, or the operations performed by the UE 705, the primary base station 710, the secondary base station 715, the target base station 720, the UPF 725, and the AMF 730 may be performed in different orders or at different times. Some operations may also be omitted from the process flow 700, and other operations may be added to the process flow 700. The UE 705, the primary base station 710, the secondary base station 715, the target base station 720, the UPF 725, and the AMF 730 may be examples of corresponding devices as described with reference to FIGS. 1 and 2, respectively.

At 732, the UE 705 may transmit an RRC resume request message to the target base station 720. At 734, the target base station 720 may transmit a retrieve UE context request message to the primary base station 710. At 736, the target base station 720 may transmit, in response to the retrieve UE context request message, a retrieve UE context response message, which may include SN information associated with the secondary base station 715. At 738, the target base station 720 may transmit an SN addition request message (with a previous identifier (e.g., an old SnXNAPID)) to the secondary base station 715. At 740, the secondary base station 715 may transmit, in response to the SN addition request message, an SN addition request acknowledgment message (also referred to as an SN addition response message), which may include an SCG radio bearer configuration (also referred to as SCG_RB_Config).

At 742, the target base station 720 may transmit an RRC resume response message to the UE 705. The RRC resume response message may include an indication (e.g., SCG re-add with delta signaling or restoreSCG). In some examples, if the restoreSCG is received in RRC resume response message, the UE 705 may initiate the random access procedure with the secondary base station 715 before transmitting the RRC resume complete message. For example, at 744, the UE 705 and the secondary base station 715 may perform a random access procedure to establish a connection between the UE 705 and the secondary base station 715. However, at 744 the random access procedure may fail. At 746, the UE 705 may transmit an RRC resume complete message to the target base station 720. The RRC resume complete message may include or exclude an SCG response based on the random access failure. For example, when UE 705 fails in accessing the secondary base station 715, the UE 705 does not include a scgResponse IE in the RRC resume complete message at 746.

At 748, the secondary base station 715 and the target base station 720 may perform an SN release, for example, based on the random access failure and the SCG response provided in the RRC resume complete message. In other words, if an scgResponse is not received in the RRC resume complete message, the target base station 720 (e.g., a new MN) releases an SN (e.g., the secondary base station 715) and does not send a message (e.g. a UE context retrieval confirm message) to the primary base station 710 (e.g., a last serving MN) indicating the SCG kept. At 750, the primary base station 310 may determine that are no messages from the target base station 720 indicating that one or both of an SN and an SCG configuration were kept by the UE 705. The primary base station 310 may trigger a timer. In other words, if the primary base station 710 (e.g., a last serving MN) does not receive the message indicating SCG kept, the primary base station 710 (e.g., a last serving MN) releases the SCG without indicating UE context kept to the SN (e.g., the secondary base station 715).

At 752, the primary base station 710 may transmit an SN release request message to the secondary base station 715, which may include an indication of the UE context indicator and DRBs transferred to the target base station 720. At 754, the secondary base station 715 may transmit, in response to the SN release request message, an SN release acknowledgment (also referred to as an SN release response message) to the primary base station 710. At 756, the primary base station 710 may transmit an Xn-U address indicator (e.g., forwarding information for SN-T bearers moving to the target base station 720) to the secondary base station 715. At 758 and 760, the UPF 725 and the primary base station 710 may perform data forwarding for MN-T bearers. At 762 and 764, the UPF 725 and the secondary base station 715 may perform data forwarding for SN-T bearers moving to the target base station 720.

At 766, the target base station 720 may transmit a path switch request message to the AMF 730. At 768, the AMF 730 may transmit, in response to the path switch request message, a bearer modification message to the UPF 725. At 770, the UPF 725 may switch a data path for one or more MN terminated bearers to the target base station 720. At 772, the UPF 725 may switch a data path for one or more SN terminated bearers to the secondary base station 715. At 774, the AMF 730 may transmit a path switch request acknowledgement (also referred to as a path switch response message) to the target base station 720. At 776, the target base station 720 may transmit a UE context release request message to the primary base station 710. At 778, the primary base station 710 may transmit a UE context release response message to the secondary base station 715.

Figure 8:
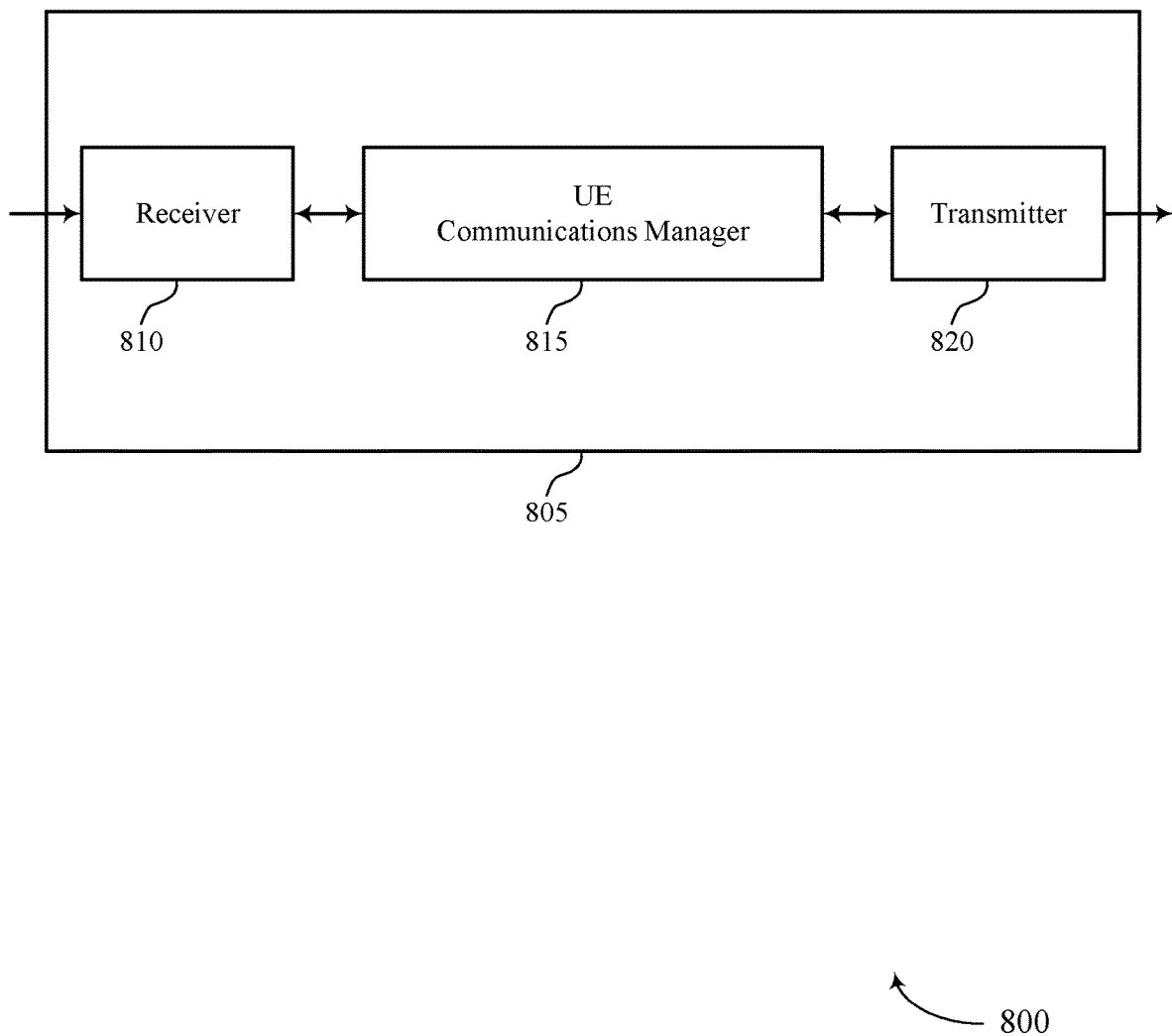
FIGS. 8 and 9 show block diagrams of devices that support techniques for wireless communications with a MN in an MCG without a change in a SN in a SCG in accordance with various aspects of the present disclosure.

FIG. 8 shows a block diagram 800 of a device 805 that supports techniques for wireless communications with a MN in an MCG without a change in a SN in a SCG in accordance with various aspects of the present disclosure. The device 805 may be an example of aspects of a UE 115 as described herein. The device 805 may include a receiver 810, a UE communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques for wireless communications with a master node in a master cell group without a change in a secondary node in a SCG, etc.). Information may be passed on to other components of the device 805. The receiver 810 may be an example of aspects of the transceiver 1020 described with reference to FIG. 10. The receiver 810 may utilize a single antenna or a set of antennas.

The UE communications manager 815 may be implemented as an integrated circuit or chipset for the device 805, and the receiver 810 and the transmitter 820 may be implemented as analog components (for example, amplifiers, filters, antennas) coupled with the device 805 modem to enable wireless transmission and reception. The actions performed by the UE communications manager 815 as described herein may be implemented to realize one or more potential advantages. At least one implementation may enable the UE communications manager 815 may transmit a request message to a target master base station based on a change in a state of the UE and receive a response message from the target master base station based on the transmitted request message from the UE. The response message including SN information and UE context reference shared to the target master base station from a source master base station. The SN information corresponding to the same secondary base station associated with the UE while previously connected to the source master base station, and the UE context reference is stored at the same secondary base station. The UE communications manager 815 may confirm a configuration associated with the same secondary base station. The UE communications manager 815 may be an example of aspects of the UE communications manager 1010 described herein.

The UE communications manager 815, or its sub-components, may be implemented in hardware, code (e.g., software or firmware) executed by a processor, or any combination thereof. If implemented in code executed by a processor, the functions of the UE communications manager 815, or its sub-components may be executed by a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described in the present disclosure.

The UE communications manager 815, or its sub-components, may be physically located at various positions, including being distributed such that portions of functions are implemented at different physical locations by one or more physical components. In some examples, the UE communications manager 815, or its sub-components, may be a separate and distinct component in accordance with various aspects of the present disclosure. In some examples, the UE communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver component. For example, the transmitter 820 may be an example of aspects of the transceiver 1020 described with reference to FIG. 10. The transmitter 820 may utilize a single antenna or a set of antennas.

Figure 9:
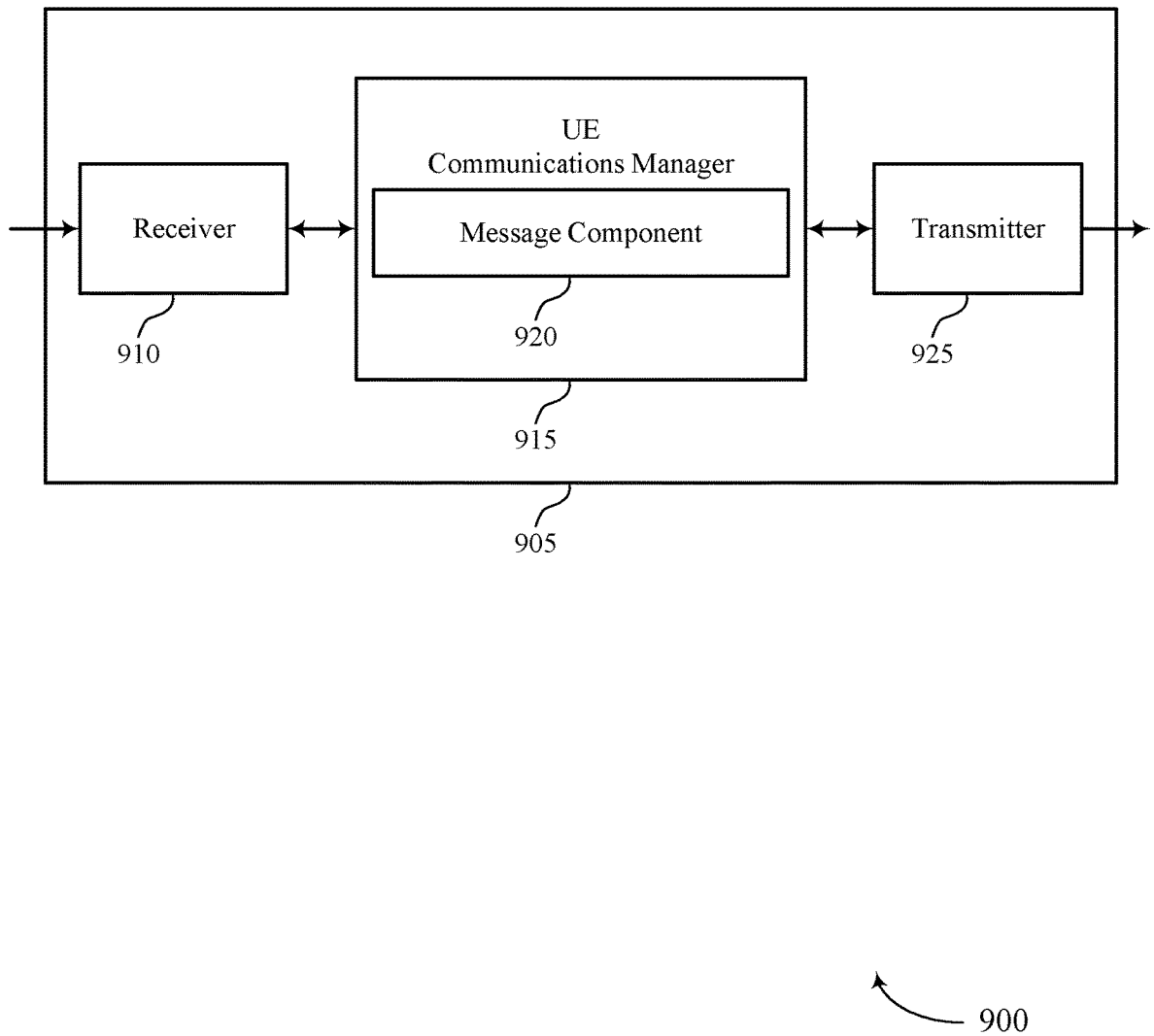

FIG. 9 shows a block diagram 900 of a device 905 that supports techniques for wireless communications with a MN in an MCG without a change in a SN in a SCG in accordance with various aspects of the present disclosure. The device 905 may be an example of aspects of a device 805, or a UE 115 as described herein. The device 905 may include a receiver 910, a UE communications manager 915, and a transmitter 925. The device 905 may also include a processor. Each of these components may be in communication with one another (e.g., via one or more buses).

The receiver 910 may receive information such as packets, user data, or control information associated with various information channels (e.g., control channels, data channels, and information related to techniques for wireless communications with a MN in an MCG without a change in a SN in a SCG, etc.). Information may be passed on to other components of the device 905. The receiver 910 may be an example of aspects of the transceiver 1020 described with reference to FIG. 10. The receiver 910 may utilize a single antenna or a set of antennas.

The UE communications manager 915 may be an example of aspects of the UE communications manager 815 as described herein. The UE communications manager 915 may include a message component 920. The UE communications manager 915 may be an example of aspects of the UE communications manager 1010 described herein. The message component 920 may transmit a request message to a target master base station based on a change in a state of the UE and receive a response message from the target master base station based on the transmitted request message from the UE. The response message including SN information and UE context reference shared to the target master base station from a source master base station. The SN information corresponding to the same secondary base station associated with the UE while previously connected to the source master base station, and the UE context reference is stored at the same secondary base station. In some cases, the request message includes an RRC message and the response message includes an RRC response message. The RRC request message includes an RRC connection resume message. The RRC request message includes an RRC connection re-establishment message. The state of the UE includes an RRC inactive state or an RRC connected state (e.g., for reestablishment). The message component 920 may confirm a configuration associated with the same secondary base station.

Additionally or alternatively, the message component 920 may transmit in a request message (e.g., an RRC re-establishment message) an indication of the device 905 preserving a SCG configuration associated with the same secondary base station. The message component 920 may determine an RLF associated with the source base station, where transmitting the request message including the indication of the device 905 preserving the SCG configuration associated with the same secondary base station is further based at least in part on the determined RLF. In some examples, the response message includes an indication to restore a connection with the same secondary base station based at least in part on one or both of the indication of the device 905 preserving the SCG configuration associated with the same secondary base station or the device 905 context reference being stored at the same secondary base station. In some examples, the response message includes an indication to report a set of RRM measurement results associated with the same secondary base station, the set of RRM measurement results including a signal strength or a signal quality associated with the same secondary base station, the message component 920 may transmit the report indicating the set of RRM measurement results to the target master base station.

The transmitter 925 may transmit signals generated by other components of the device 905. In some examples, the transmitter 925 may be collocated with a receiver 910 in a transceiver component. For example, the transmitter 925 may be an example of aspects of the transceiver 1020 described with reference to FIG. 10. The transmitter 925 may utilize a single antenna or a set of antennas.

Figure 10:
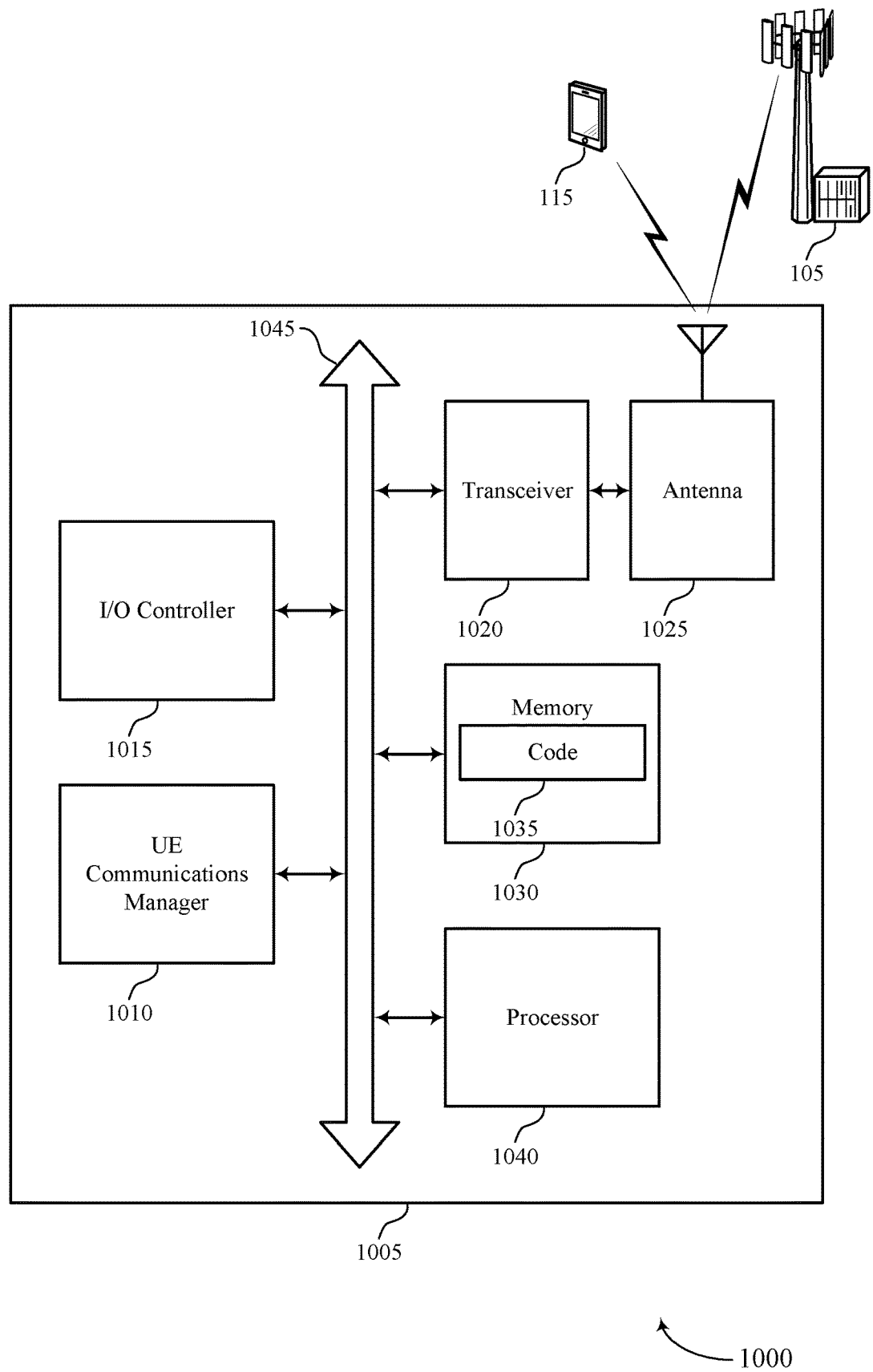
FIG. 10 shows a diagram of a system including a device that supports techniques for wireless communications with a MN in an MCG without a change in a SN in a SCG in accordance with various aspects of the present disclosure.

FIG. 10 shows a diagram of a system 1000 including a device 1005 that supports techniques for wireless communications with a MN in an MCG without a change in a SN in a SCG in accordance with various aspects of the present disclosure. The device 1005 may be an example of or include the components of device 805, device 905, or a UE 115 as described herein. The device 1005 may include components for bi-directional voice and data communications including components for transmitting and receiving communications, including a UE communications manager 1010, an I/O controller 1015, a transceiver 1020, an antenna 1025, memory 1030, and a processor 1040. These components may be in electronic communication via one or more buses (e.g., bus 1045).

The UE communications manager 1010 may transmit a request message to a target master base station based on a change in a state of the UE. The UE communications manager 1010 may receive a response message from the target master base station based on the transmitted request message from the UE. The response message including SN information and UE context reference shared to the target master base station from a source master base station. The SN information corresponding to the same secondary base station associated with the UE while previously connected to the source master base station, and the UE context reference is stored at the same secondary base station. The UE communications manager 1010 may confirm a configuration associated with the same secondary base station. Based on implementing the SN information, one or more processors of the device 1005 (for example, processor(s) controlling or incorporated with the UE communications manager 1010) may promote improvements to power consumption, spectral efficiency, higher data rates and, in some examples, may promote enhanced efficiency for high reliability and low latency wireless communications, among other benefits.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases, the device 1005 may have more than one antenna 1025, which may be capable of concurrently transmitting or receiving multiple wireless transmissions.

The memory 1030 may include random access memory (RAM) and read-only memory (ROM). The memory 1030 may store computer-readable, computer-executable code 1035 including instructions that, when executed, cause the processor 1040 to perform various functions described herein. In some cases, the memory 1030 may contain, among other things, a basic input/output system (BIOS) which may control basic hardware or software operation such as the interaction with peripheral components or devices. The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for wireless communications with a master node in a master cell group without a change in a secondary node in a SCG).

Figure 11:
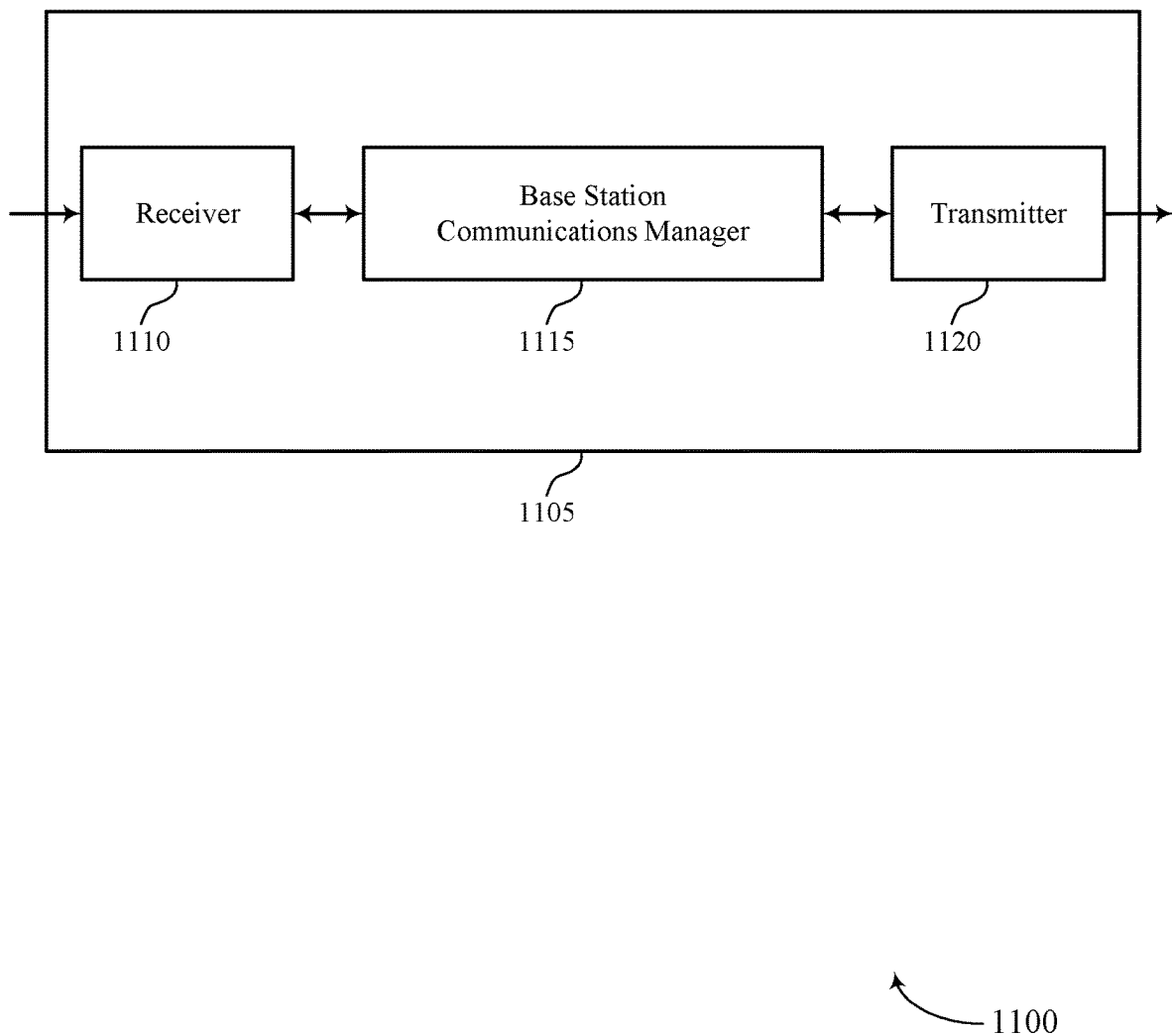
FIGS. 11 and 12 show block diagrams of devices that support techniques for wireless communications with a MN in an MCG without a change in a SN in a SCG in accordance with various aspects of the present disclosure.

FIG. 11 shows a block diagram 1100 of a device 1105 that supports techniques for wireless communications with a MN in an MCG without a change in a SN in a SCG in accordance with various aspects of the present disclosure. The device 1105 may be an example of aspects of a base station 105 as described herein. The device 1105 may include a receiver 1110, a base station communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for wireless communications with a master node in a master cell group without a change in a secondary node in a SCG, etc.). Information may be passed on to other components of the device 1105. The receiver 1110 may be an example of aspects of the transceiver 1420 described with reference to FIG. 14. The receiver 1110 may utilize a single antenna or a set of antennas.

The base station communications manager 1115 may transmit a context request message to a source master base station associated with a UE, receive, based on the transmitted context request message, a context response message including SN information and UE context reference, from the source master base station, the SN information corresponding to at least one secondary base station associated with the UE, and the UE context reference is stored at the at least one secondary base station, and perform the wireless communication with the UE based on the received context response message. Additionally, or alternatively, the base station communications manager 1115 may also receive a context request message from a target master base station associated with a UE and transmit, based on the received context request message, a context response message including SN information and UE context reference, to the target master base station, the SN information corresponding to at least one secondary base station associated with the UE, and the UE context reference is stored at the at least one secondary base station. The base station communications manager 1115 may be an example of aspects of the base station communications manager 1410 described herein.

The base station communications manager 1115, or its sub-components, may be implemented in hardware, code (e.g., software or firmware) executed by a processor, or any combination thereof. If implemented in code executed by a processor, the functions of the base station communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1115, or its sub-components, may be physically located at various positions, including being distributed such that portions of functions are implemented at different physical locations by one or more physical components. In some examples, the base station communications manager 1115, or its sub-components, may be a separate and distinct component in accordance with various aspects of the present disclosure. In some examples, the base station communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

Figure 12:
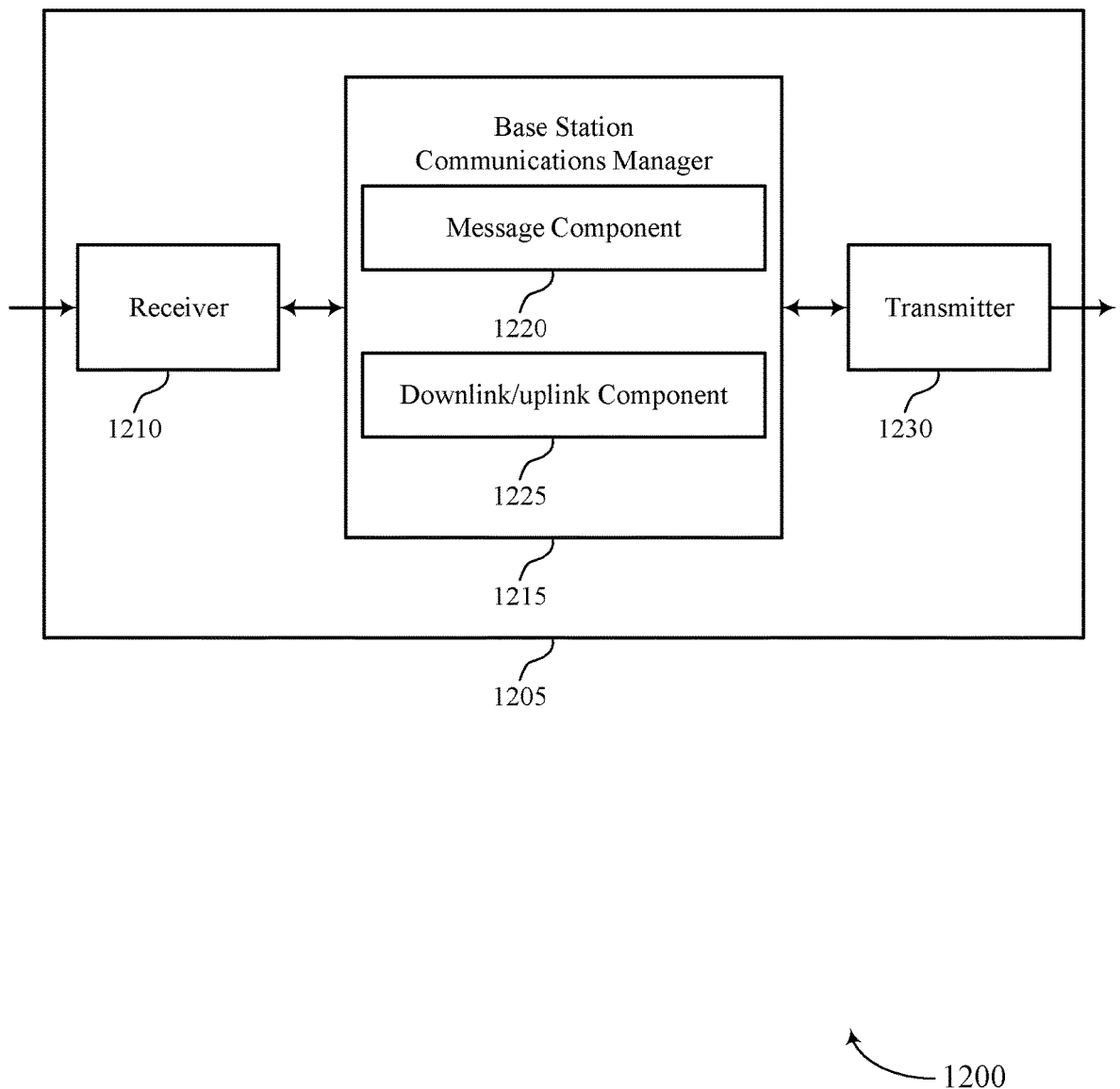

FIG. 12 shows a block diagram 1200 of a device 1205 that supports techniques for wireless communications with a MN in an MCG without a change in a SN in a SCG in accordance with various aspects of the present disclosure. The device 1205 may be an example of aspects of a device 1105, or a base station 105 as described herein. The device 1205 may include a receiver 1210, a base station communications manager 1215, and a transmitter 1230. The device 1205 may also include a processor. Each of these components may be in communication with one another (e.g., via one or more buses).

The receiver 1210 may receive information such as packets, user data, or control information associated with various information channels (e.g., control channels, data channels, and information related to techniques for wireless communications with a MN in an MCG without a change in a SN in a SCG, etc.). Information may be passed on to other components of the device 1205. The receiver 1210 may be an example of aspects of the transceiver 1420 described with reference to FIG. 14. The receiver 1210 may utilize a single antenna or a set of antennas.

The base station communications manager 1215 may be an example of aspects of the base station communications manager 1115 as described herein. The base station communications manager 1215 may include a message component 1220 and a downlink/uplink component 1225. The base station communications manager 1215 may be an example of aspects of the base station communications manager 1215 described herein. The message component 1220 may transmit a context request message to a source master base station associated with a UE and receive, based on the transmitted context request message, a context response message including SN information and UE context reference, from the source master base station, the SN information corresponding to at least one secondary base station associated with the UE, and the UE context reference is stored at the at least one secondary base station. The downlink/uplink component 1225 may perform the wireless communication with the UE based on the received context response message. Additionally, or alternatively, the message component 1220 may receive a context request message from a target master base station associated with a UE and transmit, based on the received context request message, a context response message including SN information and UE context reference, to the target master base station, the SN information corresponding to at least one secondary base station associated with the UE, and the UE context reference is stored at the at least one secondary base station.

The transmitter 1230 may transmit signals generated by other components of the device 1205. In some examples, the transmitter 1230 may be collocated with a receiver 1210 in a transceiver component. For example, the transmitter 1230 may be an example of aspects of the transceiver 1420 described with reference to FIG. 14. The transmitter 1230 may utilize a single antenna or a set of antennas.

Figure 13:
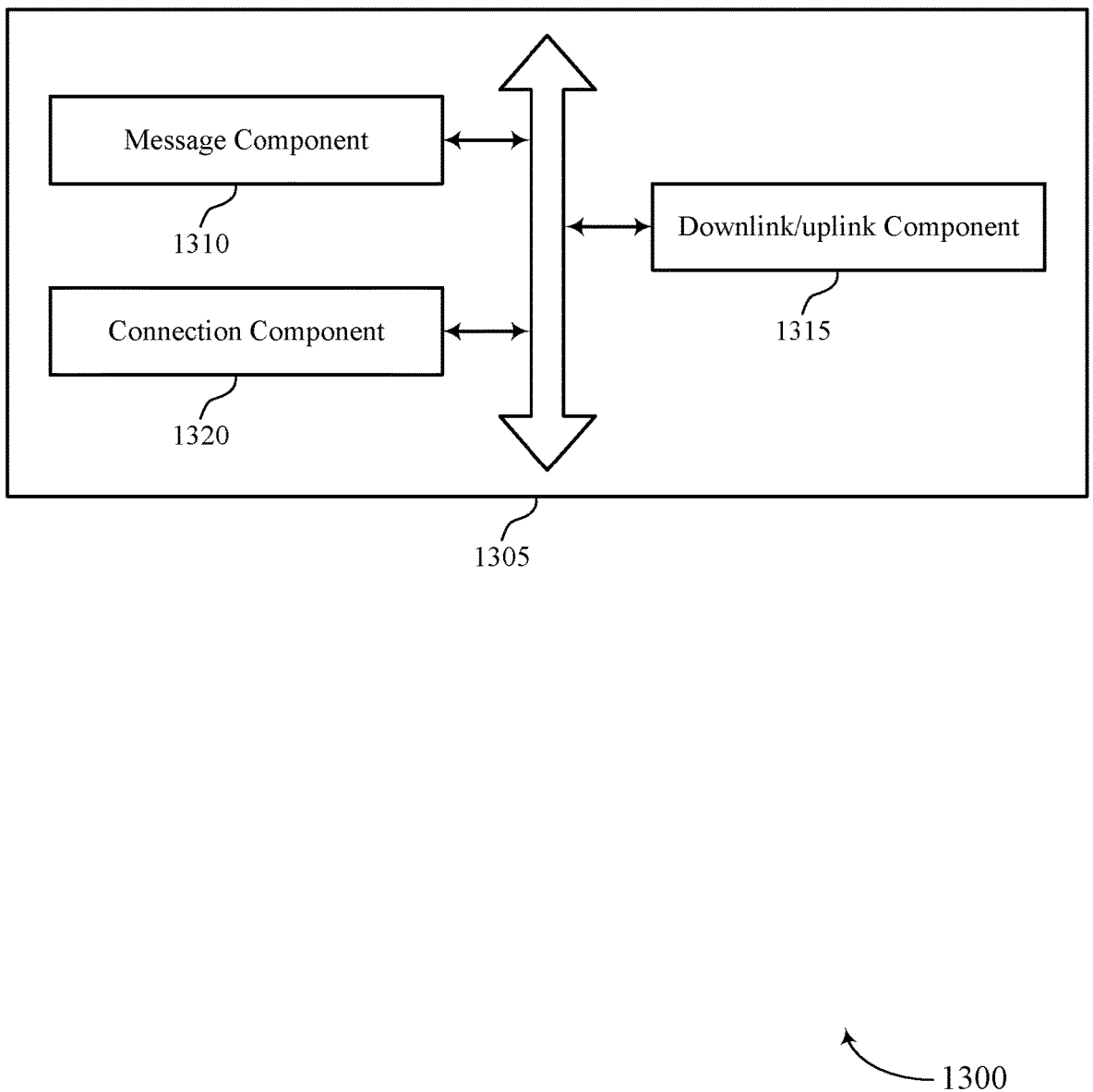
FIG. 13 shows a block diagram of a base station communications manager that supports techniques for wireless communications with a MN in an MCG without a change in a SN in a SCG in accordance with various aspects of the present disclosure.

FIG. 13 shows a block diagram 1300 of a base station communications manager 1305 that supports techniques for wireless communications with a MN in an MCG without a change in a SN in a SCG in accordance with various aspects of the present disclosure. The base station communications manager 1305 may be an example of aspects of a base station communications manager 1115, a base station communications manager 1215, or a base station communications manager 1115 described herein. The base station communications manager 1305 may include a message component 1310, a downlink/uplink component 1315, and a connection component 1320. Each of these components may communicate, directly or indirectly, with one another (e.g., via one or more buses).

The message component 1310 may transmit a context request message to a source master base station associated with a UE. In some examples, the message component 1310 may receive, based on the transmitted context request message, a context response message including SN information and UE context reference, from the source master base station. The SN information corresponding to at least one secondary base station associated with the UE, and the UE context reference is stored at the at least one secondary base station. Additionally, or alternatively, the message component 1310 may receive a context request message from a target master base station associated with a UE. In some examples, the message component 1310 may transmit, based on the received context request message, a context response message including SN information and UE context reference, to the target master base station. The SN information corresponding to at least one secondary base station associated with the UE, and the UE context reference is stored at the at least one secondary base station.

The message component 1310 may receive in an information element of the context response message the SN information. In some examples, the message component 1310 may transmit an additional context confirm message to confirm transfer of UE context information and maintain the secondary base station for the UE. In some examples, the message component 1310 may receive an RRC request message from the UE based on a change in an RRC state of the UE, where transmitting the context request message to the source master base station is based at least on the received RRC request message from the UE. In some examples, the message component 1310 may transmit an RRC response message to the UE based on the received RRC request message from the UE, the RRC response message including SCG configuration information. In some cases, the RRC state includes an RRC inactive state. In some cases, the RRC request message includes an RRC connection resume message. In some cases, the RRC request message includes an RRC connection re-establishment message.

In some cases, a target MN may indicate to a source MN in a handover request acknowledgment to keep SN UE context and accepted DRBs, PDU sessions. The additional context confirm message (e.g., Retrieve UE Context Confirm) may carry this information for the inter MN resume of the process flow 300. Additionally, or alternatively, in some examples, the message component 1310 may transmit in an information element of the context response message the SN information. In some examples, the message component 1310 may receive an additional context confirm message to confirm transfer of UE context information and maintain the secondary base station for the UE. In some cases, the additional context confirm message includes an indication of maintaining or releasing the secondary base station. In some cases, the additional context confirm message includes an indication of transferring one or more radio bearers from the source master base station. In some cases, the additional context confirm message includes an indication of transferring one or more PDUs session resources and data forwarding information from the source master base station.

The message component 1310 may transmit, to the source base station, an XN-U address indication message to share data forwarding information with the source base station, the data forwarding information including a first indication of maintaining or releasing the secondary base station, a second indication of transferring one or more radio bearers from the source master base station, or a third indication of transferring one or more PDUs session resources and data forwarding information from the source master base station, or a combination thereof. Alternatively, the message component 1310 may receive, from the target base station, an XN-U address indication message sharing data forwarding information with the source base station, the data forwarding information including a first indication of maintaining or releasing the secondary base station, a second indication of transferring one or more radio bearers from the source master base station, or a third indication of transferring one or more PDUs session resources and data forwarding information from the source master base station, or a combination thereof. The downlink/uplink component 1315 may perform the wireless communication with the UE based on the received context response message. The connection component 1320 may maintain the secondary base station for the UE, based on the SN information, during an RRC resume or an RRC connection reestablishment.

The message component 1310 may receive the request message from the UE, the request message including an indication of the UE preserving a SCG configuration associated with the at least one secondary base station. The downlink/uplink component may determine to preserve the at least one secondary base station for the UE based at least in part on one or both of the indication of the UE preserving the SCG configuration associated with the at least one secondary base station or the UE context reference being stored at the least one secondary base station. The message component 1310 may transmit a response message to the UE indicating to restore a connection with the least one secondary base station based at least in part on the determining.

The message component 1310 may transmit a response message to the UE including an indication to report a set of RRM measurement results associated with the least one secondary base station, the set of RRM measurement results including a signal strength or a signal quality associated with the least one secondary base station, and receive the report indicating the set of RRM measurement results based at least in part on the transmitted response message.

Figure 14:
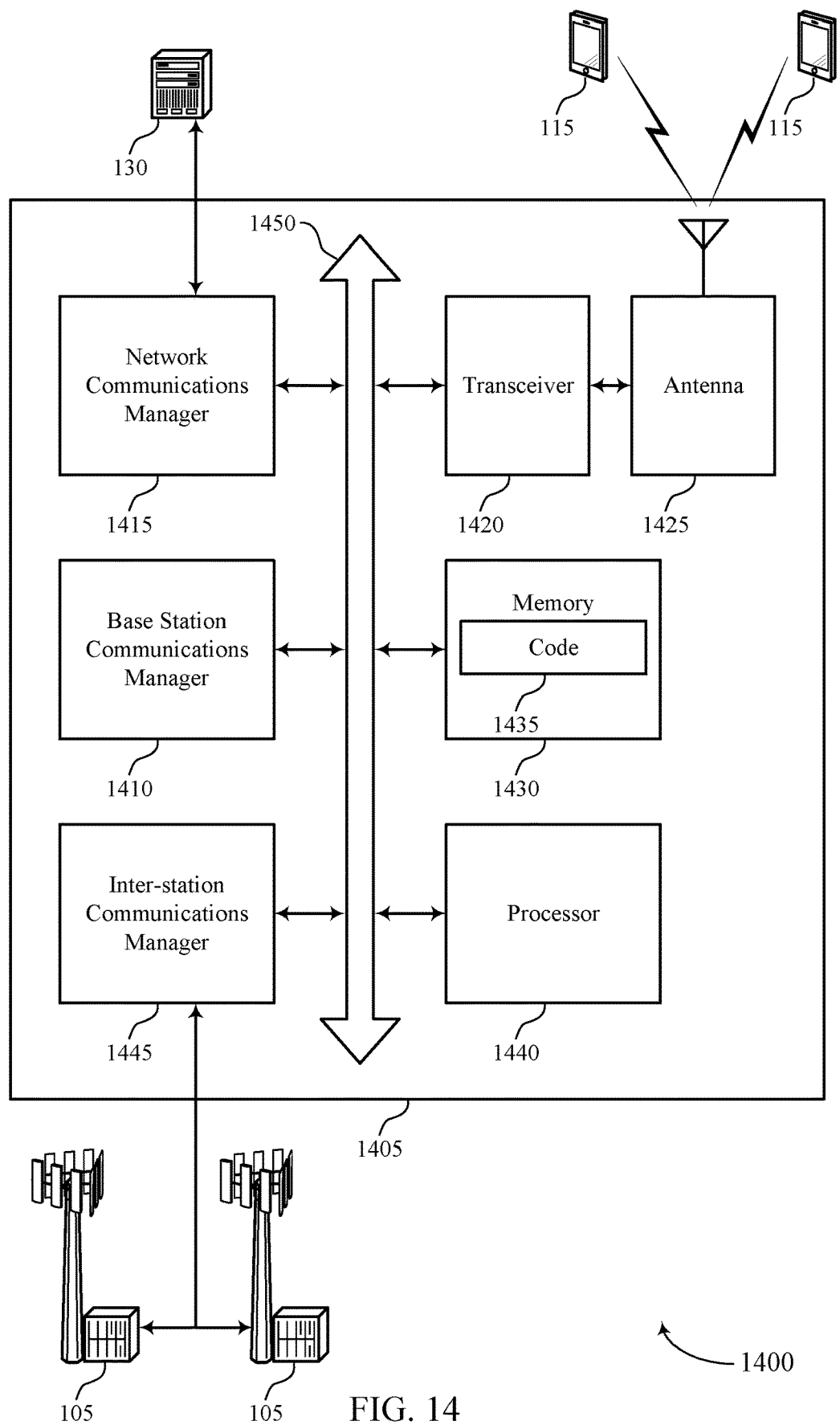
FIG. 14 shows a diagram of a system including a device that supports techniques for wireless communications with a MN in an MCG without a change in a SN in a SCG in accordance with various aspects of the present disclosure.

FIG. 14 shows a diagram of a system 1400 including a device 1405 that supports techniques for wireless communications with a MN in an MCG without a change in a SN in a SCG in accordance with various aspects of the present disclosure. The device 1405 may be an example of or include the components of device 1105, device 1205, or a base station 105 as described herein. The device 1405 may include components for bi-directional voice and data communications including components for transmitting and receiving communications, including a base station communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The base station communications manager 1410 may transmit a context request message to a source master base station associated with a UE. The base station communications manager 1410 may receive, based on the transmitted context request message, a context response message including SN information and UE context reference, from the source master base station. The SN information corresponding to at least one secondary base station associated with the UE, and the UE context reference is stored at the at least one secondary base station. The base station communications manager 1410 may perform the wireless communication with the UE based on the received context response message. Additionally, or alternatively, the base station communications manager 1410 may also receive a context request message from a target master base station associated with a UE and transmit, based on the received context request message, a context response message including SN information and UE context reference, to the target master base station. The SN information corresponding to at least one secondary base station associated with the UE, and the UE context reference is stored at the at least one secondary base station.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the device 1405 may include a single antenna 1425. However, in some cases, the device 1405 may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices. The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting techniques for wireless communications with a MN in an MCG without a change in a SN in a SCG).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

Figure 15:
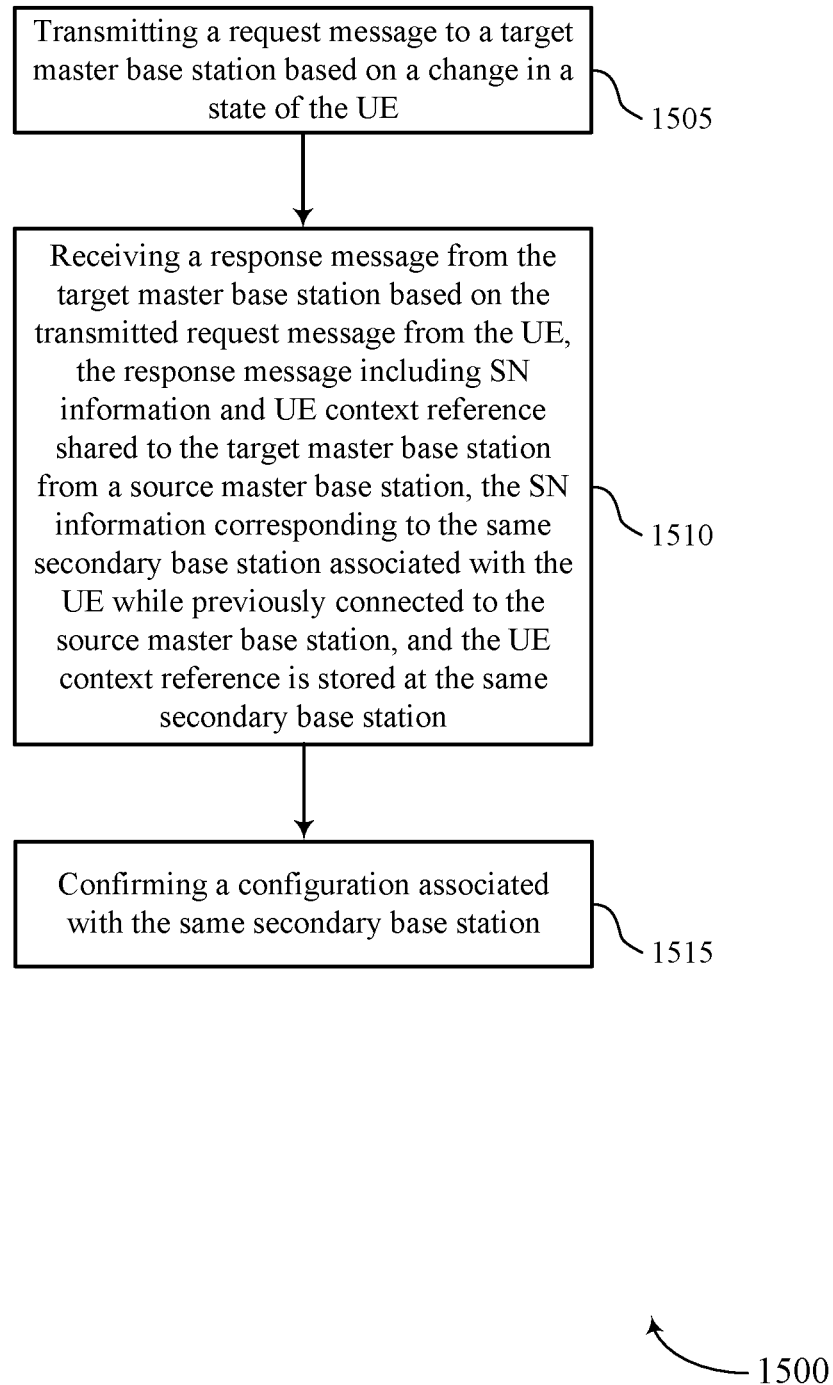
FIGS. 15 through 17 show flowcharts illustrating methods that support techniques for wireless communications with a MN in an MCG without a change in a SN in a SCG in accordance with various aspects of the present disclosure.

FIG. 15 shows a flowchart illustrating a method 1500 that supports techniques for wireless communications with a MN in an MCG without a change in a SN in a SCG in accordance with various aspects of the present disclosure. The operations of method 1500 may be implemented by a UE or its components as described herein. For example, the operations of method 1500 may be performed by a UE communications manager as described with reference to FIGS. 8 through 10. In some examples, a UE may execute a set of instructions to control the functional elements of the UE to perform the functions described below. Additionally or alternatively, a UE may perform aspects of the functions described below using special-purpose hardware.

At 1505, the UE may transmit a request message to a target master base station based on a change in a state of the UE. The operations of 1505 may be performed according to the methods described herein. In some examples, aspects of the operations of 1505 may be performed by a message component as described with reference to FIGS. 8 through 10.

At 1510, the UE may receive a response message from the target master base station based on the transmitted request message from the UE, the response message including SN information shared to the target master base station from a source master base station, the SN information and UE context reference corresponding to the same secondary base station associated with the UE while previously connected to the source master base station, and the UE context reference is stored at the same secondary base station. The operations of 1510 may be performed according to the methods described herein. In some examples, aspects of the operations of 1510 may be performed by a message component as described with reference to FIGS. 8 through 10.

At 1515, the UE may confirm a configuration (e.g., an SCG configuration) associated with the same secondary base station (e.g., a secondary node). The operations of 1515 may be performed according to the methods described herein. In some examples, aspects of the operations of 1515 may be performed by a message component as described with reference to FIGS. 8 through 10.

Figure 16:
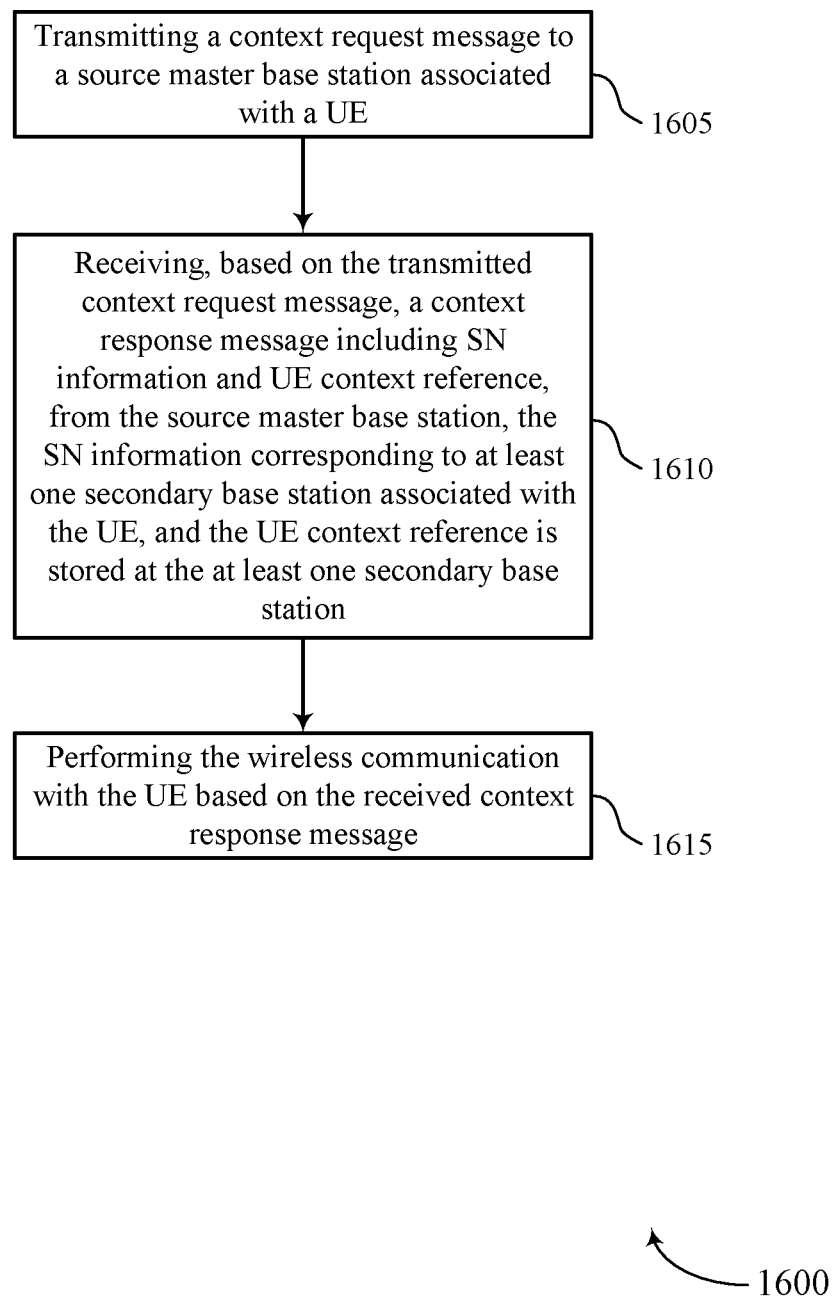

FIG. 16 shows a flowchart illustrating a method 1600 that supports techniques for wireless communications with a MN in an MCG without a change in a SN in a SCG in accordance with various aspects of the present disclosure. The operations of method 1600 may be implemented by a base station (also referred to as a target base station) or its components as described herein. For example, the operations of method 1600 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1605, the base station may transmit a context request message to a source master base station associated with a UE. The operations of 1605 may be performed according to the methods described herein. In some examples, aspects of the operations of 1605 may be performed by a message component as described with reference to FIGS. 11 through 14.

At 1610, the base station may receive, based on the transmitted context request message, a context response message including SN information and UE context reference, from the source master base station, the SN information corresponding to at least one secondary base station associated with the UE, and the UE context reference is stored at the at least one secondary base station. The operations of 1610 may be performed according to the methods described herein. In some examples, aspects of the operations of 1610 may be performed by a message component as described with reference to FIGS. 11 through 14.

At 1615, the base station may perform the wireless communication with the UE based on the received context response message. The operations of 1615 may be performed according to the methods described herein. In some examples, aspects of the operations of 1615 may be performed by a downlink/uplink component as described with reference to FIGS. 11 through 14.

Figure 17:
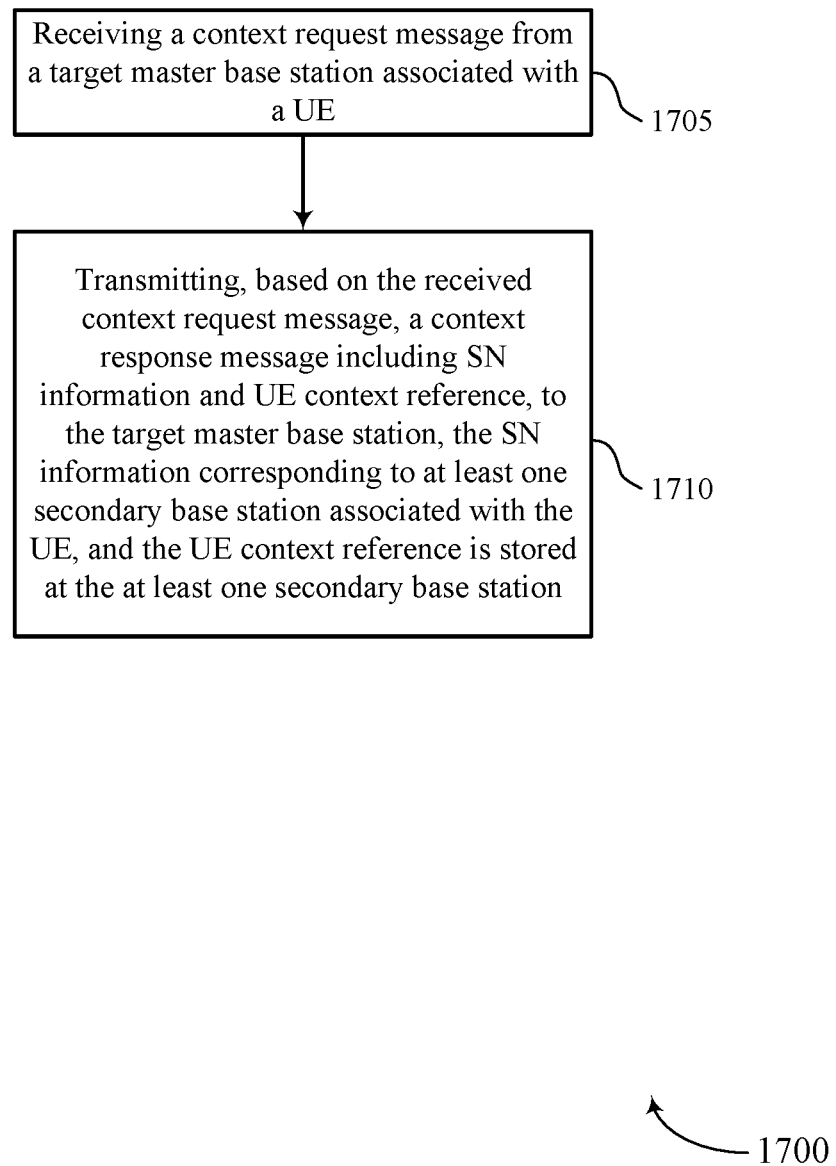

FIG. 17 shows a flowchart illustrating a method 1700 that supports techniques for wireless communications with a MN in an MCG without a change in a SN in a SCG in accordance with various aspects of the present disclosure. The operations of method 1700 may be implemented by a base station (also referred to as a source base station) (e.g., a last serving base station) or its components as described herein. For example, the operations of method 1700 may be performed by a base station communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may receive a context request message from a target master base station associated with a UE. The operations of 1705 may be performed according to the methods described herein. In some examples, aspects of the operations of 1705 may be performed by a message component as described with reference to FIGS. 11 through 14.

At 1710, the base station may transmit, based on the received context request message, a context response message including SN information and UE context reference, to the target master base station, the SN information corresponding to at least one secondary base station associated with the UE, and the UE context reference is stored at the at least one secondary base station. The operations of 1710 may be performed according to the methods described herein. In some examples, aspects of the operations of 1710 may be performed by a message component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: transmitting a request message to a target master base station based at least in part on a change in a state of the UE; receiving a response message from the target master base station based at least in part on the transmitted request message from the UE, the response message including secondary node information and UE context reference shared to the target master base station from a source master base station, the secondary node information corresponding to the same secondary base station associated with the UE while previously connected to the source master base station, and the UE context reference is stored at the same secondary base station; and confirming a configuration associated with the same secondary base station.

Aspect 2: The method of aspect 1, wherein the request message includes an RRC message and the response message includes an RRC response message.

Aspect 3: The method of aspect 2, wherein the RRC request message includes an RRC connection resume message or an RRC connection re-establishment message.

Aspect 4: The method of any of aspects 1 through 3, wherein the state of the UE includes an RRC inactive state, an RRC connected state, or an RRC idle state.

Aspect 5: The method of any of aspects 1 through 4, wherein the request message includes an indication of the UE preserving a SCG configuration associated with the same secondary base station.

Aspect 6: The method of aspect 5, further comprising: determining a radio link failure associated with the source master base station, wherein transmitting the request message including the indication of the UE preserving the SCG configuration associated with the same secondary base station is further based at least in part on the determined radio link failure.

Aspect 7: The method of aspect 6, wherein the response message includes an indication to restore a connection with the same secondary base station based at least in part on one or both of the indication of the UE preserving the SCG configuration associated with the same secondary base station or the UE context reference being stored at the same secondary base station.

Aspect 8: The method of any of aspects 1 through 7, wherein the response message includes an indication to report a set of RRM measurement results associated with the same secondary base station, the set of RRM measurement results including a signal strength or a signal quality associated with the same secondary base station, the method further comprising: transmitting the report indicating the set of RRM measurement results to the target master base station.

Aspect 9: A method for wireless communication at a target master base station, comprising: transmitting a context request message to a source master base station associated with a UE; receiving, based at least in part on the transmitted context request message, a context response message including secondary node information and UE context reference, from the source master base station, the secondary node information corresponding to at least one secondary base station associated with the UE, and the UE context reference is stored at the at least one secondary base station; and performing the wireless communication with the UE based at least in part on the received context response message.

Aspect 10: The method of aspect 9, further comprising: receiving in an information element of the context response message the secondary node information.

Aspect 11: The method of any of aspects 9 through 10, further comprising: maintaining the secondary base station for the UE, based at least in part on the secondary node information, during an RRC resume or an RRC connection reestablishment.

Aspect 12: The method of any of aspects 9 through 11, further comprising: transmitting an additional context confirm message to confirm transfer of UE context information and maintain the secondary base station for the UE.

Aspect 13: The method of aspect 12, wherein the additional context confirm message includes an indication of maintaining or releasing the secondary base station.

Aspect 14: The method of any of aspects 12 through 13, wherein the additional context confirm message includes an indication of transferring one or more radio bearers from the source master base station.

Aspect 15: The method of any of aspects 12 through 14, wherein the additional context confirm message includes an indication of transferring one or more packet data units session resources and data forwarding information from the source master base station.

Aspect 16: The method of any of aspects 9 through 15, further comprising: receiving an RRC request message from the UE based at least in part on a change in an RRC state of the UE, wherein transmitting the context request message to the source master base station is based at least on the received RRC request message from the UE.

Aspect 17: The method of aspect 16, wherein the RRC state comprises an RRC inactive state, an RRC connected state, or an RRC idle state.

Aspect 18: The method of any of aspects 16 through 17, wherein the RRC request message includes an RRC connection resume message or an RRC connection re-establishment message.

Aspect 19: The method of any of aspects 16 through 18, wherein the RRC request message includes an RRC connection re-establishment message.

Aspect 20: The method of any of aspects 16 through 19, further comprising: transmitting an RRC response message to the UE based at least in part on the received RRC request message from the UE, the RRC response message including SCG configuration information.

Aspect 21: The method of any of aspects 16 through 20, further comprising: transmitting, to the source base station, an XN-U address indication message to share data forwarding information with the source base station.

Aspect 22: The method of any of aspects 9 through 21, further comprising: receiving the request message from the UE, the request message including an indication of the UE preserving a SCG configuration associated with the at least one secondary base station; determining to preserve the at least one secondary base station for the UE based at least in part on one or both of the indication of the UE preserving the SCG configuration associated with the at least one secondary base station or the UE context reference being stored at the least one secondary base station; transmitting a response message to the UE indicating to restore a connection with the least one secondary base station based at least in part on the determining; and releasing the same secondary base station (e.g., secondary node) based at least in part on a lack of persevering the SCG configuration.

Aspect 23: The method of any of aspects 9 through 22, further comprising: transmitting a response message to the UE including an indication to report a set of RRM measurement results associated with the least one secondary base station, the set of RRM measurement results including a signal strength or a signal quality associated with the least one secondary base station; and receiving the report indicating the set of RRM measurement results based at least in part on the transmitted response message.

Aspect 24: A method for wireless communication at a source master base station, comprising: receiving a context request message from a target master base station associated with a UE; and transmitting, based at least in part on the received context request message, a context response message including secondary node information and UE context reference, to the target master base station, the secondary node information corresponding to at least one secondary base station associated with the UE, and the UE context reference is stored at the at least one secondary base station.

Aspect 25: The method of aspect 24, further comprising: transmitting in an information element of the context response message the secondary node information.

Aspect 26: The method of any of aspects 24 through 25, further comprising: receiving an additional context confirm message to confirm transfer of UE context information and maintain the secondary base station for the UE.

Aspect 27: The method of aspect 26, wherein the additional context confirm message includes an indication of maintaining or releasing the secondary base station during an RRC resume or an RRC connection reestablishment.

Aspect 28: The method of any of aspects 26 through 27, wherein the additional context confirm message includes an indication of transferring one or more radio bearers from the source master base station to the target master base station.

Aspect 29: The method of any of aspects 26 through 28, wherein the additional context confirm message includes an indication of transferring one or more packet data units session resources and data forwarding information from the source master base station to the target master base station.

Aspect 30: An apparatus for wireless communication at a UE, comprising a processor; memory coupled with the processor; and instructions stored in the memory and executable by the processor to cause the apparatus to perform a method of any of aspects 1 through 8.

Aspect 31: An apparatus for wireless communication at a UE, comprising at least one means for performing a method of any of aspects 1 through 8.

Aspect 32: A non-transitory computer-readable medium storing code for wireless communication at a UE, the code comprising instructions executable by a processor to perform a method of any of aspects 1 through 8.

Aspect 33: An apparatus for wireless communication at a target master base station, comprising a processor; memory coupled with the processor; and instructions stored in the memory and executable by the processor to cause the apparatus to perform a method of any of aspects 9 through 23.

Aspect 34: An apparatus for wireless communication at a target master base station, comprising at least one means for performing a method of any of aspects 9 through 23.

Aspect 35: A non-transitory computer-readable medium storing code for wireless communication at a target master base station, the code comprising instructions executable by a processor to perform a method of any of aspects 9 through 23.

Aspect 36: An apparatus for wireless communication at a source master base station, comprising a processor; memory coupled with the processor; and instructions stored in the memory and executable by the processor to cause the apparatus to perform a method of any of aspects 24 through 29.

Aspect 37: An apparatus for wireless communication at a source master base station, comprising at least one means for performing a method of any of aspects 24 through 29.

Aspect 38: A non-transitory computer-readable medium storing code for wireless communication at a source master base station, the code comprising instructions executable by a processor to perform a method of any of aspects 24 through 29.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    transmitting a request message to a target master network entity based at least in part on a change in a state of the UE;
    receiving a response message from the target master network entity based at least in part on the transmitted request message from the UE, the response message including secondary node information and UE context reference shared to the target master network entity from a source master network entity, the secondary node information corresponding to a same secondary network entity associated with the UE while previously connected to the source master network entity, and the UE context reference is stored at the same secondary network entity; and
    confirming a configuration associated with the same secondary network entity.

2. The method of claim 1, wherein the request message includes a radio resource control message and the response message includes a radio resource control response message.

3. The method of claim 2, wherein the radio resource control request message includes a radio resource control connection resume message or a radio resource control connection re-establishment message.

4. The method of claim 1, wherein the state of the UE includes a radio resource control inactive state, a radio resource control connected state, or a radio resource control idle state.

5. The method of claim 1, wherein the request message includes an indication of the UE preserving a secondary cell group configuration associated with the same secondary network entity.

6. The method of claim 5, further comprising:
    determining a radio link failure associated with the source master network entity,
    wherein transmitting the request message including the indication of the UE preserving the secondary cell group configuration associated with the same secondary network entity is further based at least in part on the determined radio link failure.

7. The method of claim 6, wherein the response message includes an indication to restore a connection with the same secondary network entity based at least in part on one or both of the indication of the UE preserving the secondary cell group configuration associated with the same secondary network entity or the UE context reference being stored at the same secondary network entity.

8. The method of claim 1, wherein the response message includes an indication to report a set of radio resource management measurement results associated with the same secondary network entity, the set of radio resource management measurement results including a signal strength or a signal quality associated with the same secondary network entity, the method further comprising:

transmitting the report indicating the set of radio resource management measurement results to the target master network entity.

9. A user equipment (UE), comprising:

one or more memories storing processor-executable code; and one or more processors coupled with the one or more memories and individually or collectively operable to execute the code to cause the UE to:

transmit a request message to a target master network entity based at least in part on a change in a state of the UE;

receive a response message from the target master network entity based at least in part on the transmitted request message from the UE, the response message including secondary node information and UE context reference shared to the target master network entity from a source master network entity, the secondary node information corresponding to a same secondary network entity associated with the UE while previously connected to the source master network entity, and the UE context reference is stored at the same secondary network entity; and confirm a configuration associated with the same secondary network entity.

10. The UE of claim 9, wherein the request message includes a radio resource control message and the response message includes a radio resource control response message.

11. The UE of claim 10, wherein the radio resource control request message includes a radio resource control connection resume message or a radio resource control connection re-establishment message.

12. The UE of claim 9, wherein the state of the UE includes a radio resource control inactive state, a radio resource control connected state, or a radio resource control idle state.

13. The UE of claim 9, wherein the request message includes an indication of the UE preserving a secondary cell group configuration associated with the same secondary network entity.

14. The UE of claim 13, wherein the one or more processors are individually or collectively further operable to execute the code to cause the UE to:

determine a radio link failure associated with the source master network entity, wherein the request message including the indication of the UE preserving the secondary cell group configuration associated with the same secondary network entity is further based at least in part on the determined radio link failure.

15. The UE of claim 14, wherein the response message includes an indication to restore a connection with the same secondary network entity based at least in part on one or both of the indication of the UE preserving the secondary cell group configuration associated with the same secondary network entity or the UE context reference being stored at the same secondary network entity.

16. The UE of claim 9, wherein the response message includes an indication to report a set of radio resource management measurement results associated with the same secondary network entity, and the one or more processors are individually or collectively further operable to execute the code to cause the UE to:

transmit the report indicating the set of radio resource management measurement results to the target master network entity.

17. A user equipment (UE) for wireless communication, comprising:

means for transmitting a request message to a target master network entity based at least in part on a change in a state of the UE;

means for receiving a response message from the target master network entity based at least in part on the transmitted request message from the UE, the response message including secondary node information and UE context reference shared to the target master network entity from a source master network entity, the secondary node information corresponding to a same secondary network entity associated with the UE while previously connected to the source master network entity, and the UE context reference is stored at the same secondary network entity; and means for confirming a configuration associated with the same secondary network entity.

18. The UE of claim 17, wherein the request message includes a radio resource control message and the response message includes a radio resource control response message.

19. The UE of claim 18, wherein the radio resource control request message includes a radio resource control connection resume message or a radio resource control connection re-establishment message.

20. The UE of claim 17, wherein the state of the UE includes a radio resource control inactive state, a radio resource control connected state, or a radio resource control idle state.

21. The UE of claim 17, wherein the request message includes an indication of the UE preserving a secondary cell group configuration associated with the same secondary network entity.

22. The UE of claim 21, further comprising:

means for determining a radio link failure associated with the source master network entity, wherein the request message including the indication of the UE preserving the secondary cell group configuration associated with the same secondary network entity is further based at least in part on the determined radio link failure.

23. The UE of claim 22, wherein the response message includes an indication to restore a connection with the same secondary network entity based at least in part on one or both of the indication of the UE preserving the secondary cell group configuration associated with the same secondary network entity or the UE context reference being stored at the same secondary network entity.

24. The UE of claim 17, wherein the response message includes an indication to report a set of radio resource management measurement results associated with the same secondary network entity, the UE further comprising:

means for transmitting the report indicating the set of radio resource management measurement results to the target master network entity.

25. A non-transitory computer-readable medium storing code for wireless communication, the code comprising instructions executable by one or more processors to:

transmit, from a user equipment (UE), a request message to a target master network entity based at least in part on a change in a state of the UE;

receive a response message from the target master network entity based at least in part on the transmitted request message from the UE, the response message including secondary node information and UE context reference shared to the target master network entity from a source master network entity, the secondary node information corresponding to a same secondary network entity associated with the UE while previously connected to the source master network entity, and the UE context reference is stored at the same secondary network entity; and confirm a configuration associated with the same secondary network entity.

26. The non-transitory computer-readable medium of claim 25, wherein the request message includes a radio resource control message and the response message includes a radio resource control response message.

27. The non-transitory computer-readable medium of claim 26, wherein the radio resource control request message includes a radio resource control connection resume message or a radio resource control connection re-establishment message.

28. The non-transitory computer-readable medium of claim 25, wherein the state of the UE includes a radio resource control inactive state, a radio resource control connected state, or a radio resource control idle state.

29. The non-transitory computer-readable medium of claim 25, wherein the request message includes an indication of the UE preserving a secondary cell group configuration associated with the same secondary network entity.

30. The non-transitory computer-readable medium of claim 25, wherein the response message includes an indication to report a set of radio resource management measurement results associated with the same secondary network entity, and the instructions are further executable by the one or more processors to:

transmit the report indicating the set of radio resource management measurement results to the target master network entity.

* * * * *